(12) United States Patent
Hwang et al.

(10) Patent No.: US 11,516,786 B2
(45) Date of Patent: Nov. 29, 2022

(54) BANDWIDTH PART (BWP) ACTIVATION USING DYNAMIC SWITCHING IN A WIRELESS COMMUNICATION SYSTEM

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/627,679

(22) PCT Filed: Jan. 11, 2019

(86) PCT No.: PCT/KR2019/000466
§ 371 (c)(1),
(2) Date: Dec. 30, 2019

(87) PCT Pub. No.: WO2019/139411
PCT Pub. Date: Jul. 18, 2019

(65) Prior Publication Data
US 2020/0351837 A1    Nov. 5, 2020

Related U.S. Application Data

(60) Provisional application No. 62/630,743, filed on Feb. 14, 2018, provisional application No. 62/616,411, filed on Jan. 11, 2018.

(51) Int. Cl.
*H04W 72/04* (2009.01)
*H04L 1/18* (2006.01)

(52) U.S. Cl.
CPC ......... *H04W 72/042* (2013.01); *H04L 1/1812* (2013.01)

(58) Field of Classification Search
CPC ........................ H04W 72/042; H04L 1/1812
See application file for complete search history.

(56) References Cited

U.S. PATENT DOCUMENTS

| 10,693,620 B2 * | 6/2020 | Zhou ................. H04W 72/0453 |
| 10,841,149 B2 * | 11/2020 | Nagaraja ............. H04L 43/0823 |
| 10,903,949 B2 * | 1/2021 | Abdoli .................. H04L 5/0039 |
| 2011/0103243 A1 | 5/2011 | Larsson et al. |
| 2012/0113866 A1 | 5/2012 | Tenny et al. |

(Continued)

FOREIGN PATENT DOCUMENTS

WO    WO 2019/193402    10/2019

OTHER PUBLICATIONS

U.S. Appl. No. 62/577,805 (Drawings, Specification Sections: I, II & III) (Year: 2017).*

(Continued)

*Primary Examiner* — Ian N Moore
*Assistant Examiner* — Rushil Parimal Sampat
(74) *Attorney, Agent, or Firm* — Fish & Richardson P.C.

(57) ABSTRACT

Provided are a method for operating a device in a wireless communication system, and a device using the method. The method comprises: detecting downlink control information (DCI) indicating a change in the bandwidth part (BWP) for the device; and changing the bandwidth part from a first bandwidth part to a second bandwidth part on the basis of the DCI, wherein the second bandwidth part is applied from a slot scheduled by the DCI.

9 Claims, 19 Drawing Sheets

(56) References Cited

U.S. PATENT DOCUMENTS

| | | | |
|---|---|---|---|
| 2018/0317234 A1* | 11/2018 | Lindoff | H04L 5/0098 |
| 2019/0090299 A1* | 3/2019 | Ang | H04L 5/001 |
| 2019/0103954 A1* | 4/2019 | Lee | H04W 72/042 |
| 2019/0215870 A1* | 7/2019 | Babaei | H04W 24/10 |

OTHER PUBLICATIONS

U.S. Appl. No. 62/567,199 (Drawings, Specification) (Year: 2017).*
U.S. Appl. No. 62/615,287; Babaei et al. filed Jan. 9, 2018.*
U.S. Appl. No. 62/561,096, filed 2017.*
KR Allowance of Patent in Korean Application No. KR10-2019-7015813, dated Mar. 5, 2020, 6 pages (with English translation).
KR Office Action in Korean Application No. KR10-2019-7015813, dated Sep. 27, 2019, 9 pages (with English translation).
Huawei, HiSilicon, "Remaining issues on bandwidth part," R1-1719380, 3GPP TSG RAN WG1 Meeting #91, Reno, USA, dated Nov. 27-Dec. 1, 2017, 12 pages.
MediaTek Inc., "Remaining Details on Bandwidth Part Operation in NR," R1-1719551, 3GPP TSG RAN WG1 Meeting 91, Reno, USA, dated Nov. 27-Dec. 1, 2017, 12 pages.
LG Electronics, "Remaining issues on bandwidth parts," R1-1719935, 3GPP TSG RAN WG1 Meeting 91, Reno, USA, dated Nov. 27-Dec. 1, 2017, 9 pages.
Extended European Search Report in European Appln. No. 19738123.9, dated Jun. 26, 2020, 11 pages.
$3^{rd}$ Generation Partnership Project; Qualcomm Incorporated; "Open Issues on BWP," R1-1720693, 3GPP TSG RAN WG1, Reno, NV, USA, dated Nov.-Dec. 2017, 15 pages.
3rd Generation Partnership Project; LG Electronics; "Remaining issues on bandwidth part operation," R1-1800384, 3GPP TSG RAN WG1, Vancouver, Canada, dated Jan. 2018, 14 pages.
Japanese Office Action in JP Appln. No. 2020-501348, dated Feb. 16, 2021, 8 pages (with English translation).
Vivo, "Other aspects on bandwidth Parts," R1-1719800, 3GPP TSG RAN WG1 Meeting 91, Reno, USA, Nov. 27-Dec. 1, 2017, 9 pages.

* cited by examiner

BANDWIDTH PART (BWP) ACTIVATION USING DYNAMIC SWITCHING IN A WIRELESS COMMUNICATION SYSTEM

CROSS-REFERENCE TO RELATED APPLICATIONS

This application is a National Stage application under 35 U.S.C. § 371 of International Application No. PCT/KR2019/000466, filed on Jan. 11, 2019, which claims the benefit of U.S. Provisional Applications No. 62/616,411 filed on Jan. 11, 2018 and No. 62/630,743 filed on Feb. 14, 2018. The disclosures of the prior applications are incorporated by reference in their entirety.

BACKGROUND OF THE DISCLOSURE

Field of the Disclosure

The present disclosure relates to wireless communication and, more specifically, to a method for operating a terminal in a wireless communication system and a device using the same method.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

In a future wireless communication system such as NR, a bandwidth part (BWP) can be introduced. To allocate some bandwidths to terminals that have difficulty in supporting a broad band in a wireless communication system using the broad band, the bandwidth part can be used.

It is necessary to define methods for setting and managing a bandwidth part and methods for transmitting and receiving data using the same. For example, when an active bandwidth part changes, a terminal operation related to a timing at which the changed bandwidth part is applied needs to be defined. Furthermore, when a (uplink) bandwidth part changes in a time duration from when downlink control information for scheduling a data channel is received to when ACK/NACK (acknowledgement/negative-acknowledgement) for the data channel is transmitted, it is also necessary to define terminal operation.

SUMMARY OF THE DISCLOSURE

An object of the present disclosure is to provide a method for operating a terminal related to bandwidth part change in a wireless communication system and a device using the same.

In one aspect, provided is a method for operating a user equipment (UE) in a wireless communication system. The method includes detecting downlink control information (DCI) informing bandwidth part (BWP) change and changing a BWP from a first BWP to a second BWP based on the DCI. The second BWP is applied from a slot scheduled by the DCI.

The DCI may inform downlink BWP change or uplink BWP change.

The UE may not transmit or receive a signal until the slot scheduled by the DCI starts.

A timer value related to returning to a default BWP may be maintained between a timing at which the DCI is received and a timing at which a PDSCH or a PUSCH scheduled by the DCI is received.

The first BWP and the second BWP may be BWPs related with a same cell.

The DCI may be received through some symbols in a slot including a plurality of symbols in a time domain.

In another aspect, provided is a device. The device includes a transceiver configured to transmit and receive a radio signal and a processor operating in connection with the transceiver. The processor detects downlink control information (DCI) informing bandwidth part (BWP) change and change a BWP from a first BWP to a second BWP based on the DCI. The second BWP is applied from a slot scheduled by the DCI.

In still another aspect, provided is a device comprising: a transceiver configured to transmit and receive a radio signal and a processor operating in connection with the transceiver. The processor transmits downlink control information (DCI) informing bandwidth part (BWP) change and communicates with a user equipment (UE) through a BWP changed based on the DCI. The changed BWP is applied from a slot scheduled by the DCI.

According to the present disclosure, UE operations in various situations in which a bandwidth part changes are clearly defined. For example, when downlink control information indicating change of an active downlink bandwidth part is received, a UE can apply the changed downlink bandwidth part from a slot in which downlink data channel scheduled by the downlink control information is received. Further, a (uplink) bandwidth part changes in a time duration from when downlink control information for scheduling a data channel is received to when ACK/NACK (acknowledgement/negative-acknowledgement) for the data channel is transmitted, ACK/NACK transmission through resources indicated by the downlink control information may not be performed. According to clear definition of such UE operations, ambiguity between a base station and a UE can be reduced and interference occurrence due to unnecessary signal transmission can be prevented.

DESCRIPTION OF EXEMPLARY EMBODIMENTS

Figure 1:
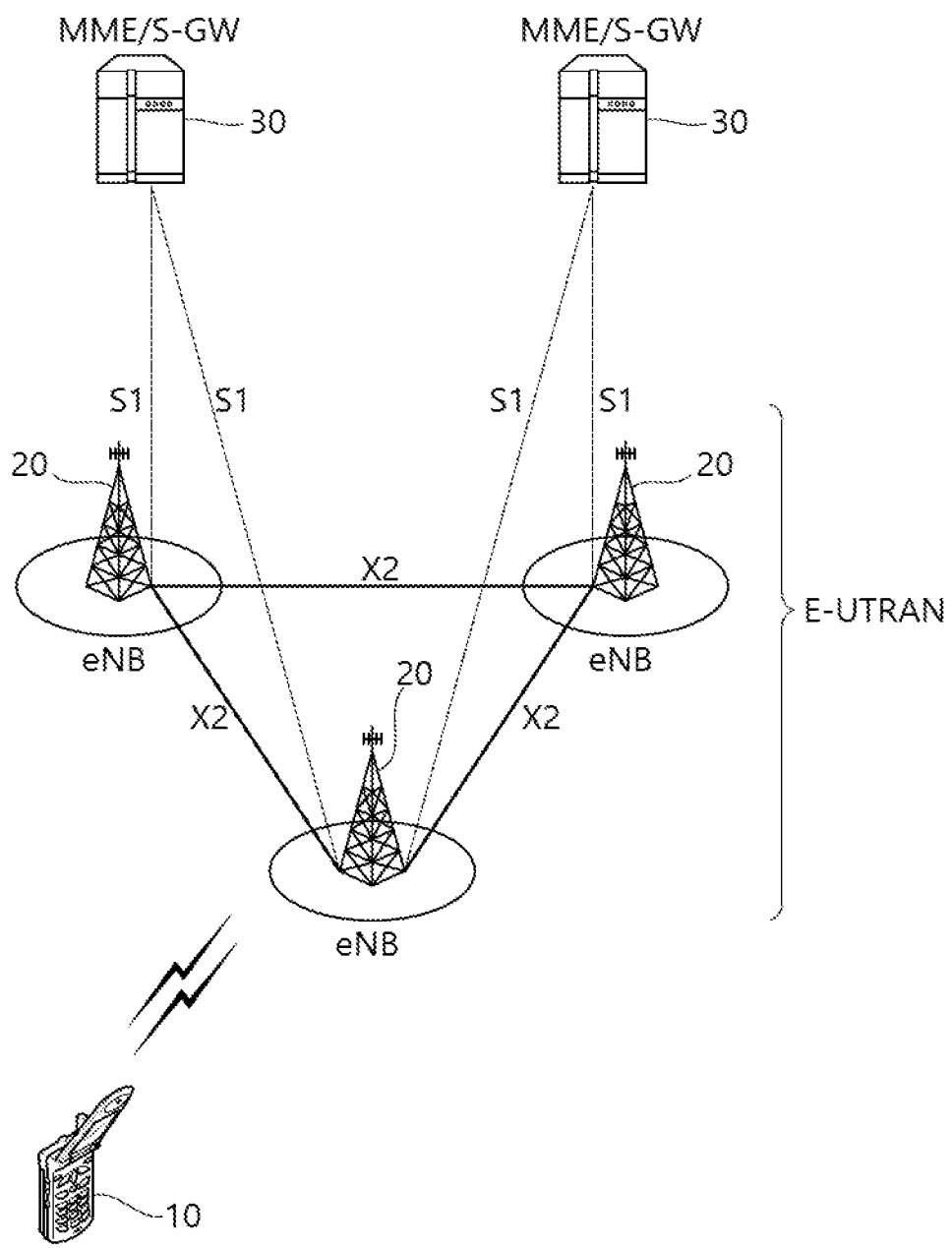
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
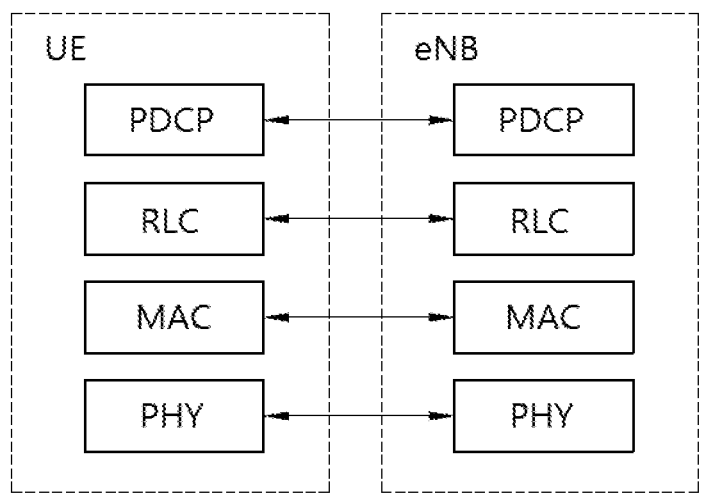
FIG. 2 is a diagram showing a radio protocol architecture for a user plane.
Figure 3:
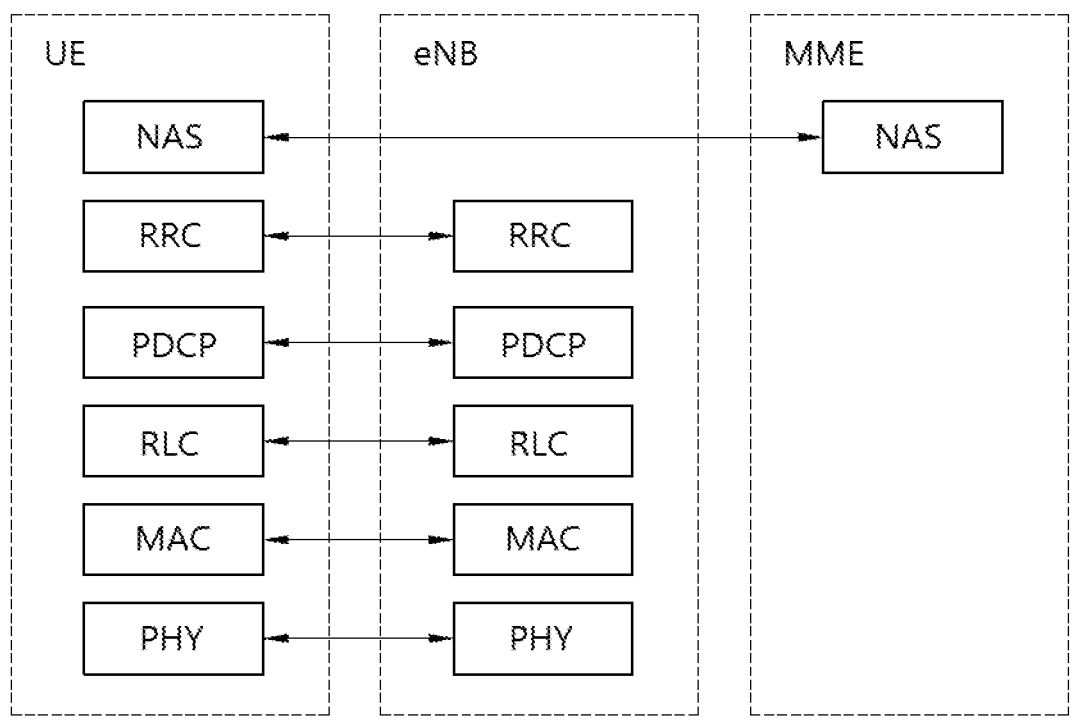
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
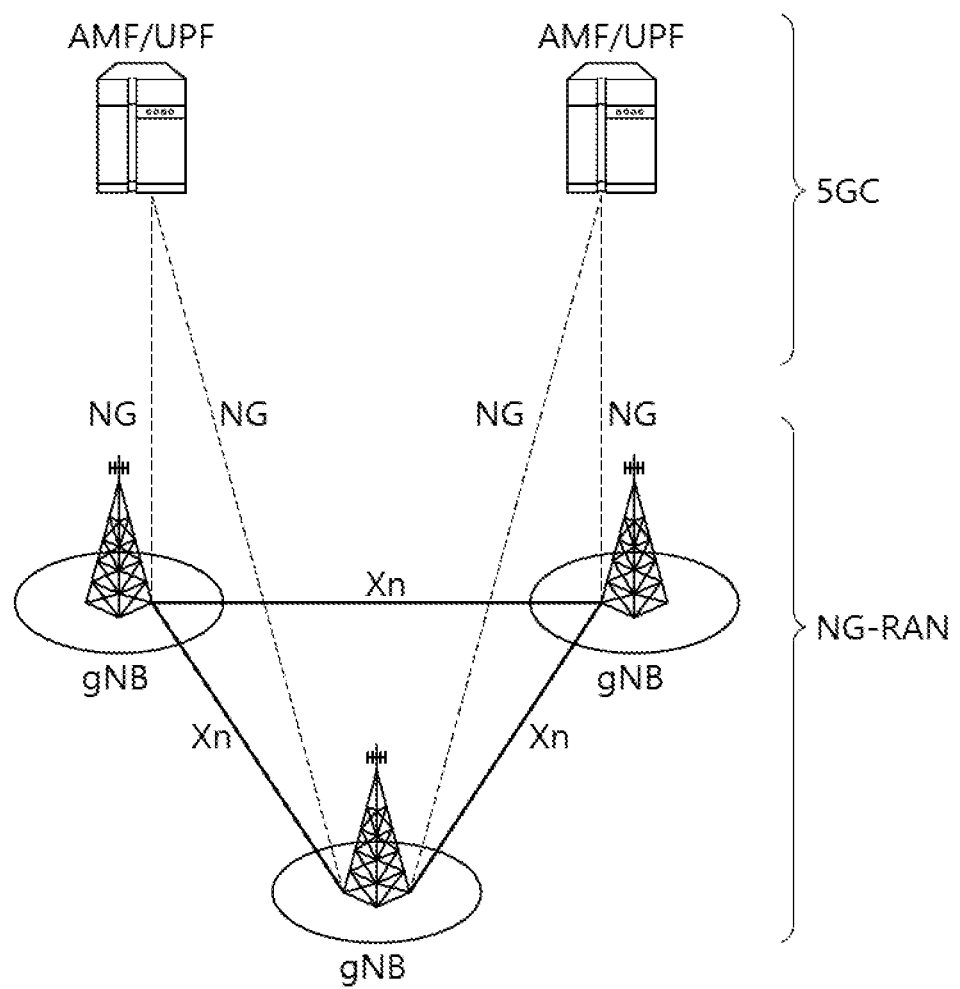
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
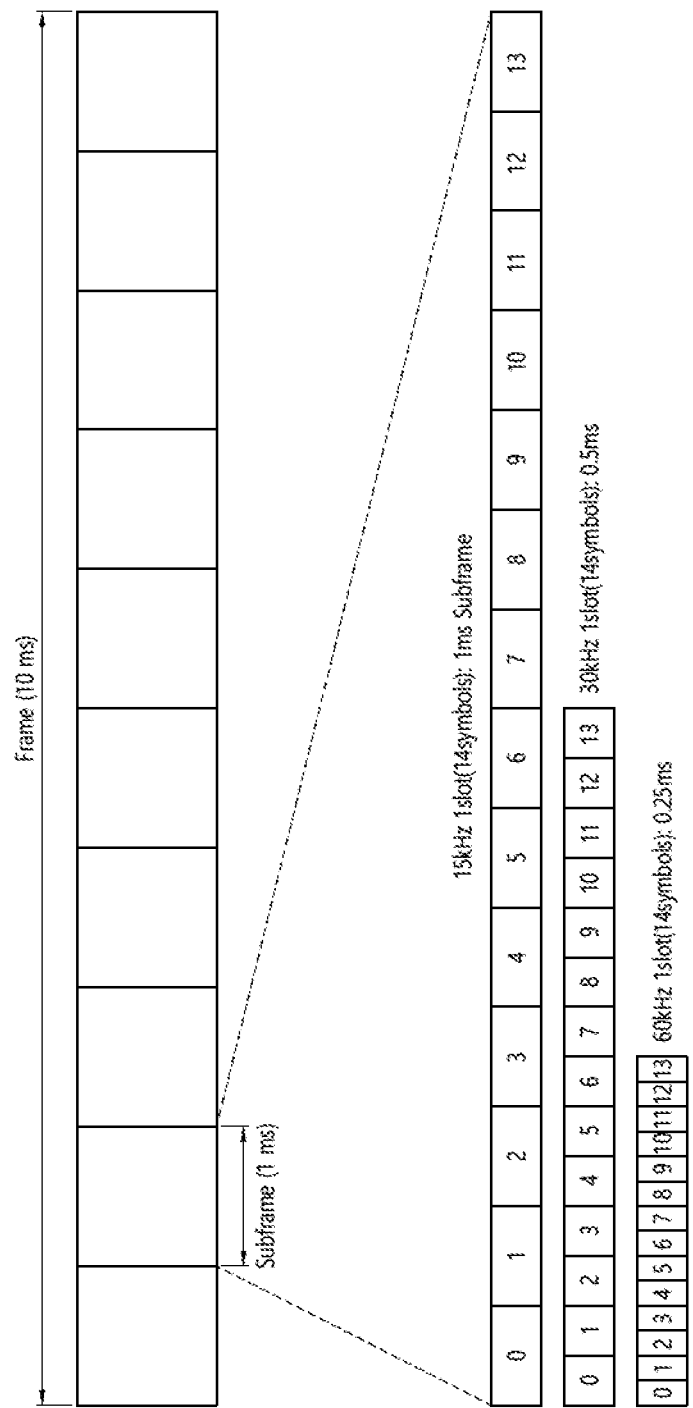
FIG. 5 illustrates a frame structure that may be applied in NR.

FIG. 5 illustrates a frame structure applicable in NR.

Referring to FIG. 5, a frame can be 10 ms (milliseconds) and can include 10 subframes each having a length of 1 ms.

Various fields in the time domain can be represented by a time unit $Tc=1/(\Delta f_{max} \cdot N_f)$. Here, $\Delta f_{max}=480 \cdot 10^3$ Hz and $N_f=4096$.

Carriers may include a set of frames on uplink and a set of frames on downlink. Transmission of an uplink frame i can be started ahead of a downlink frame i corresponding thereto by $T_{TA}=(N_{TA}+N_{TA,offset})T_c$.

One or a plurality of slots may be included in a subframe according to subcarrier spacings.

The following table illustrates a subcarrier spacing configuration μ.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal |
|   |    | Extended |
| 3 | 120 | normal |
| 4 | 240 | normal |

The following table 2-1 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ. Table 2-2 shows the number $N^{frame,\mu}_{slot}$ of slots in a frame, the number $N^{subframe,\mu}_{slot}$ of slots in a subframe and the number $N^{slot}_{symb}$ of symbols in a slot according to a subcarrier spacing configuration μ in an extended CP.

TABLE 2-1

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2-2

| μ | $N^{slot}_{symb}$ | $N^{frame,\mu}_{slot}$ | $N^{subframe,\mu}_{slot}$ |
|---|---|---|---|
| 2 | 12 | 40 | 4 |

In FIG. 5, μ=0, 1, 2 is illustrated.

A slot may include a plurality of orthogonal frequency division multiplexing (OFDM) symbols. The plurality of OFDM symbols in a slot may be classified into downlink (indicated by D), flexible (indicated by X), and uplink (indicated by U). A format of the slot may be determined depending on which of the D, X, and U the OFDM symbols in the slot are configured.

The following table shows an example of a slot format.

TABLE 3

| format | \multicolumn{14}{c}{Symbol number in a slot} |
|---|---|

| format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | U | D | D | D | D | X | U | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | X | U | U | D | D | X | X | X | U | U |
| 51 | D | X | X | X | X | X | U | D | X | X | X | X | X | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | D | D | D | D | D | D | D |
| 56-255 | \multicolumn{14}{c}{Reserved} |

A format of a slot of a terminal may be configured through higher layer signaling, through a DCI, or on the basis of a combination of higher layer signaling and the DCI.

An antenna port is defined such that a channel carrying symbols on the antenna port can be inferred from a channel carrying other symbols on the same antenna port. If extensive characteristics of a channel carrying symbols on an antenna port can be inferred from a channel carrying symbols on another antenna port, these two antenna ports are said to be quasi-co-located. The extensive characteristics may include at least one of delay spread, Doppler spread, a Doppler shift, an average gain, an average delay and spatial Rx parameters.

A resource grid can be defined to include specific numbers of subcarriers and OFDM symbols for each numerology and carrier and can start at a common resource block indicated by higher layer signaling.

A resource element (RE) is each element of a resource grid with respect to antenna port and subcarrier spacing configurations and can correspond to a complex value.

A resource block (RB) can be defined as consecutive subcarriers (e.g., 12 subcarriers) in the frequency domain. A reference resource block can be numbered in ascending order from 0 in the frequency domain. Subcarrier 0 of reference resource block is also represented as "reference point A" and is common for all subcarrier spacing configurations. In addition, this can be used as a common reference point for other resource block grids, and the reference point A can be obtained from a higher layer parameter.

A common resource block can be numbered in ascending order from 0 in the frequency domain for subcarrier spacing configuration. Subcarrier 0 of common resource block 0 for subcarrier spacing configuration can be consistent with the "reference point A".

A physical resource block and a virtual resource block can be defined in a carrier bandwidth part and can be numbered in ascending order from 0.

According to carrier aggregation, up to 15 secondary cells other than a primary cell can be aggregated and used. That is, a maximum of 16 serving cells can be aggregated for a UE.

A physical downlink control channel (PDCCH) may include one or more control channel elements (CCEs) as illustrated in the following table.

TABLE 4

| Aggregation level | Number of CCEs |
| --- | --- |
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
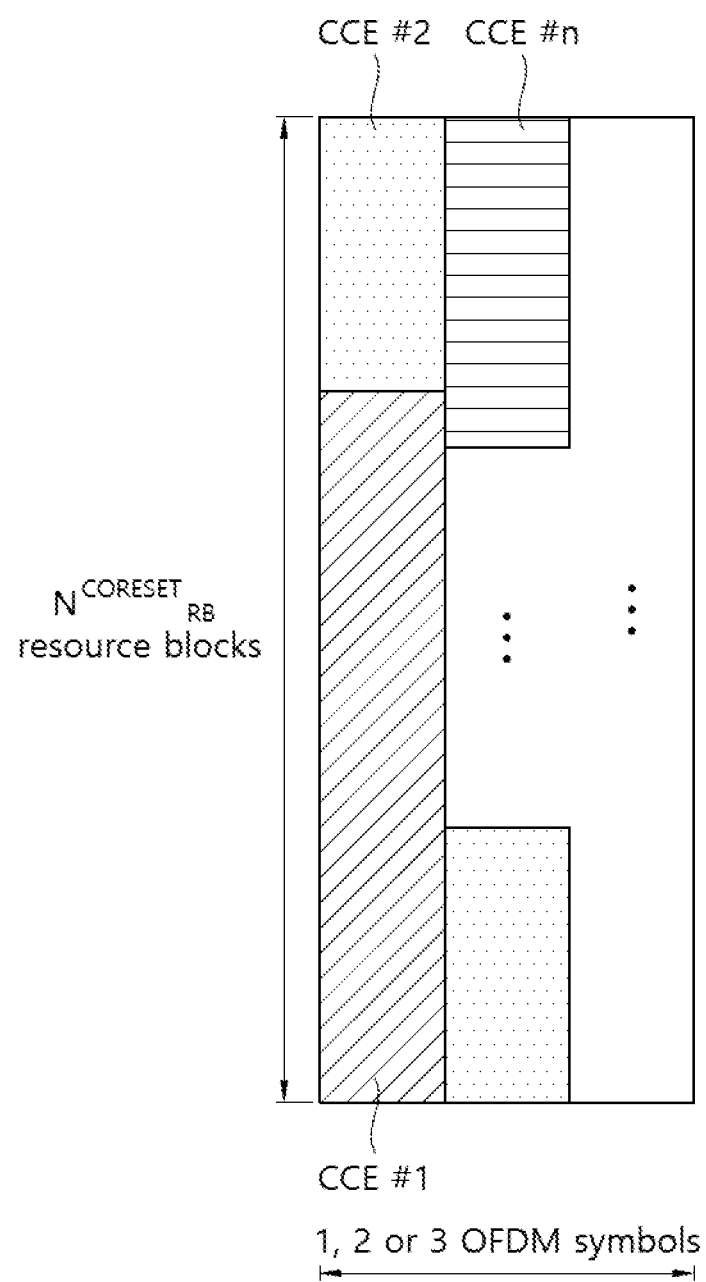
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
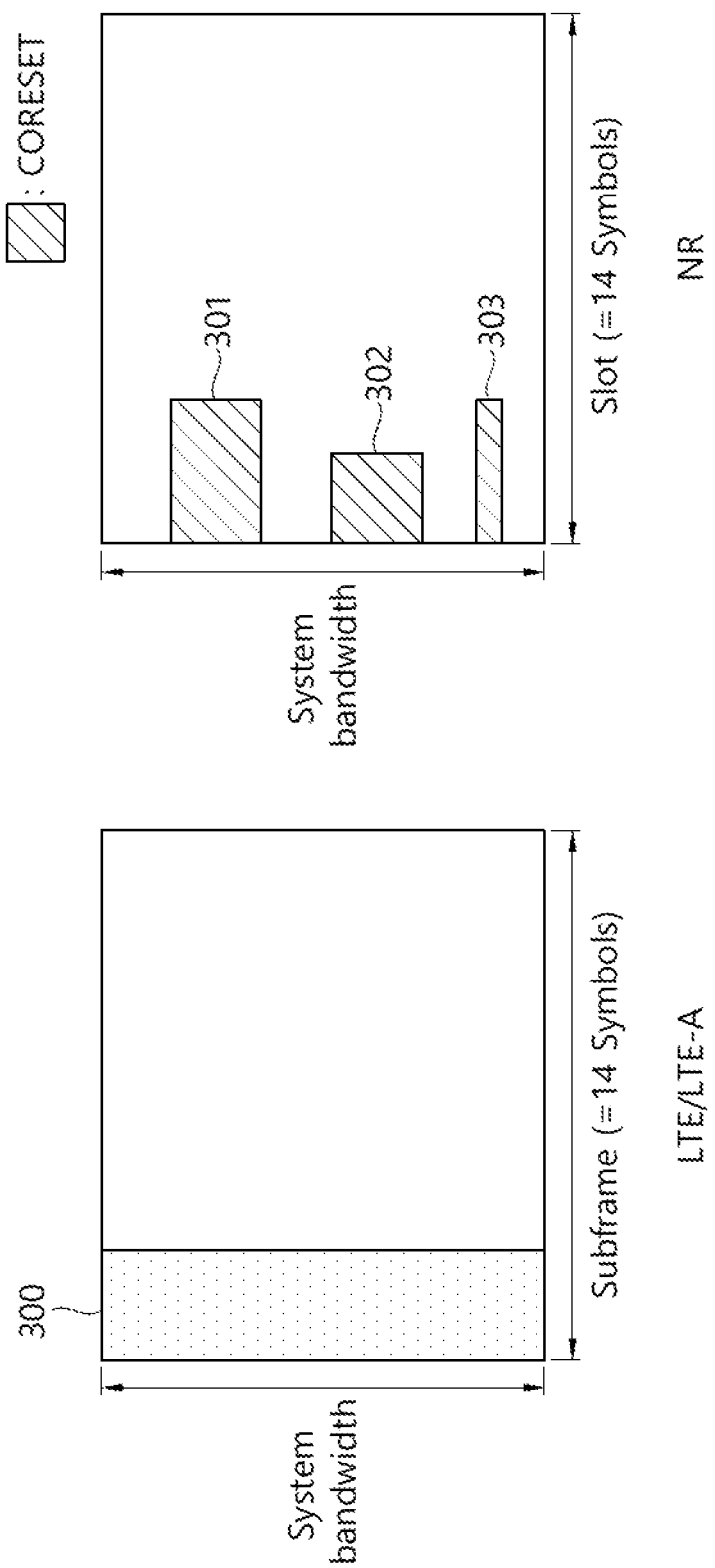
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Figure 8:
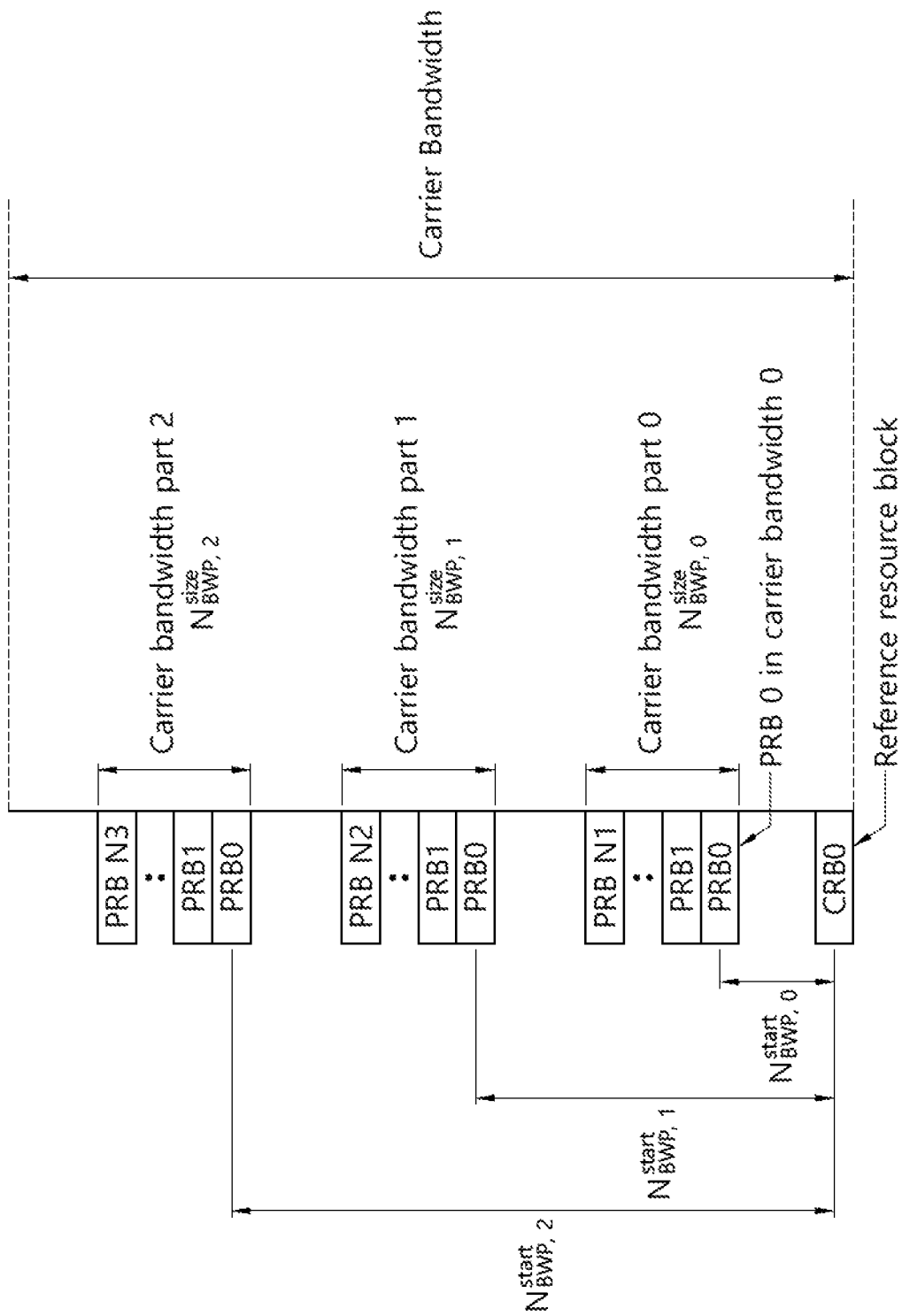
FIG. 8 illustrates carrier bandwidth parts newly introduced to NR.

FIG. 8 illustrates carrier bandwidth parts newly introduced to NR.

Referring to FIG. 8, a carrier bandwidth part may be simply referred to as a bandwidth part (BWP). As described above, various numerologies (e.g., various subcarrier spacings) may be supported for the same carrier in future wireless communication systems. NR may define a common resource block (CRB) for a given numerology in a given carrier.

A bandwidth part is a set of consecutive physical resource blocks (PRBs) selected from consecutive subsets of common resource blocks (CRBs) for given numerology in a given carrier.

As illustrated in FIG. 8, a common resource block may be determined depending on which numerology, e.g., which subcarrier spacing, is used for which carrier bandwidth. The common resource block may be indexed (starting from 0) from a lowest frequency of a carrier bandwidth, and a resource grid (which may be referred to as a common resource block resource grid) with a common resource block as a unit may be defined.

The bandwidth part may be indicated on the basis of a CRB having a lowest index (which may be referred to as "CRB 0"). The CRB 0 having the lowest index may also be referred to as "point A".

For example, under a given numerology of a given carrier, an i-th bandwidth part (BWP) may be indicated by $N^{start}_{BWP,i}$ and $N^{size}_{BWP,i}$. $N^{start}_{BWP,i}$ may indicate a starting CRB of the i-th BWP based on CRB 0, and $N^{size}_{BWP,i}$ may indicate a size of the i-th BWP in the frequency domain (e.g., in units of PRBs). PRBs of each BWP may be indexed from zero. Indices of the CRB of each BWP may be mapped to the indices of the PRBs. For example, mapping may be performed such that $n_{CRB}=n_{PRB}+N^{start}_{BWP,i}$.

In downlink, up to four downlink bandwidth parts may be configured for a UE, but only one downlink bandwidth part may be activated at a given time. The UE does not expect to receive a PDSCH, a PDCCH, a CSI-RS, and the like, in any downlink bandwidth part other than the activated downlink bandwidth part. Each of the downlink bandwidth parts may include at least one CORESET.

In uplink, up to four uplink bandwidth parts may be configured for the UE, but only one uplink bandwidth part may be activated at a given time. The UE does not transmit a PUSCH, a PUCCH, or the like, in any uplink bandwidth part other than the activated uplink bandwidth part. NR operates in a broadband as compared with the conventional system, and not all terminals may support such a broadband. The bandwidth part (BWP) features that even a terminal that may not be able to support the broadband is operable.

A UE configured to operate in a bandwidth part (BWP) of a serving cell can be allocated a maximum of 4 bandwidth part (BWP) sets by a higher layer for the serving cell.

An initial active DL BWP can be defined by the positions and number of neighboring PRBs, a subcarrier spacing and a CP with respect to a control resource set for type 0-PDCCH common search space. For an operation in a primary cell, a UE can be provided with higher layer parameters for a random access procedure.

In the case of an unpaired spectrum operation, a UE can expect that a center frequency for a DL BWP is the same as a center frequency for a UL BWP.

A resource allocation type will now be described. The resource allocation type specifies how a scheduler (e.g., a BS) allocates resource blocks for each transmission. For example, when a BS allocates a bandwidth including a plurality of resource blocks to a UE, the BS may inform the UE about resource blocks allocated to the UE through a bitmap composed of bits respectively corresponding to the resource blocks of the bandwidth. In this case, flexibility of resource allocation may be increased but the amount of information used for resource allocation is disadvantageously increased.

Considering these advantages and disadvantages, the following three resource allocation types may be defined/used.

1) Resource allocation type 0 allocates resources through a bitmap, and each bit of the bitmap indicates a resource block group (RBG) instead of a resource block. That is, in the resource allocation type 0, resource allocation is performed in units of resource block groups, rather than by resource block levels. The following table illustrates sizes of RBGs in use when a system band consists of $N^{DL}_{RB}$ number of resource blocks.

TABLE 5

| System Bandwidth $N_{RB}^{DL}$ | RBG Size (P) |
|---|---|
| ≤10 | 1 |
| 11-24 | 2 |
| 25-63 | 6 |
| 64-110 | 12 |

2) Resource allocation type 1 is a method of allocating resources in units of RBG subsets. One RBG subset may include a plurality of RBGs. For example, RBG subset #0 includes RBG #0, 3, 6, 9 . . . , RBG subset #1 includes RBG #1, 4, 7, 10, . . . , RBG subset #2 includes RBG #2, 5, 8, 11, . . . , and so on. The number of RBGs included in one RBG subset and the number of resource blocks (RB) included in one RBG are configured to be equal. Resource allocation type 1 indicates which of the RBG subsets is used and which RB is used in the RBG subset being used.

3) Resource allocation type 2 is a method of allocating resources in a manner of informing about a starting position (RB number) of an allocated bandwidth and the number of consecutive resource blocks. The consecutive resource blocks may start from the starting position. However, it is to be understood that the consecutive resource blocks are not necessarily physically consecutive but may mean that the logical or virtual resource block indexes are consecutive.

In the future wireless communication system, the number of resource blocks constituting the RBG (or group of RBs) may be changed flexibly. Here, information for the RBG, e.g., information indicating the number of resource blocks constituting the RBG, may be transmitted through a scheduling DCI, third physical layer (L1) signaling, or higher layer signaling such as an RRC message.

In addition, in the future wireless communication system, resource allocation information (e.g., information regarding RBG, described above) may include information on a time domain in addition to information on a frequency domain, and which information is included, in which manner information is included, and the like, may also be changed flexibly.

Figure 9:
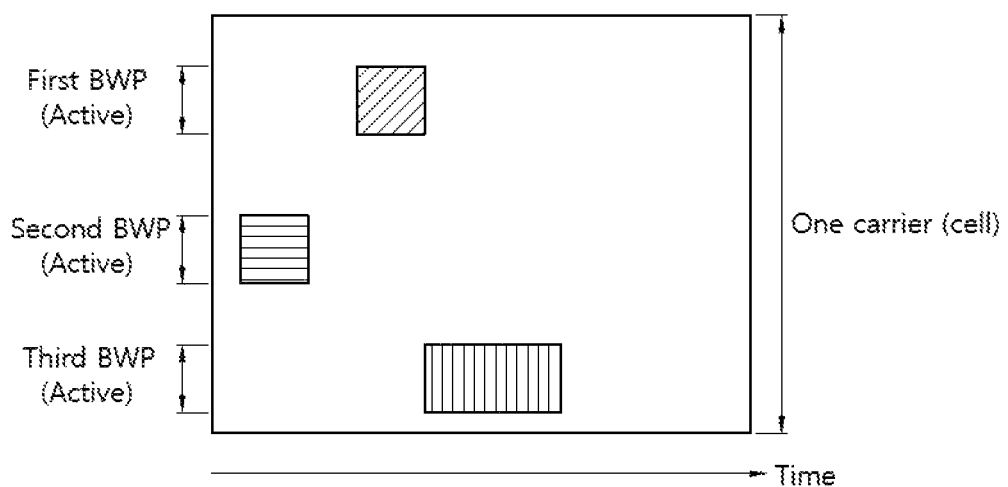
FIG. 9 illustrates a case in which BWPs are dynamically activated in a single carrier.

FIG. 9 illustrates a case in which BWPs are dynamically activated in a single carrier.

Referring to FIG. 9, a plurality of BWPs such as a first BWP, a second BWP and a third BWP a UE can be configured for a UE in a single carrier (or cell). The UE may be instructed to change BWPs through downlink control information (DCI). For example, the DCI may include a bandwidth part indicator, and the bandwidth part indicator can signal bandwidth part change by indicating a bandwidth part other than the currently active bandwidth part. The DCI may be DCI format 1_1 used to schedule a PDSCH in a single cell and can indicate (signal) downlink bandwidth part change. Alternatively, the DCI may be DCI format 0_1 used to schedule a PUSCH in a single cell and can indicate (signal) uplink bandwidth part change.

The first, second and third BWPs may be separated or be close to each other in the time domain and may be close to each other or separated by several PRBs or subcarriers in the frequency domain.

When a DL BWP changes (to a value indicated in DCI scheduling a PDSCH) in BWP operation in a cell in which an unpaired spectrum is assumed, a UL BWP linked thereto can also change. Similarly, when a UL BWP changes (to a value indicated in DCI scheduling a PUSCH), a DL BWP linked thereto can also change. That is, even if change of a DL BWP or a UL BWP is indicated through DCI corresponding thereto, the DL BWP and the UL BWP can be changed together when they are actually changed. In other words, even if change of only a DL BWP (or a UL BWP) is indicated through DCI, the DL BWP and the UL BWP (linked thereto) can be changed together.

HARQ-ACK Feedback Transmission Conditions in Dynamic BWP Operation

Figure 10:
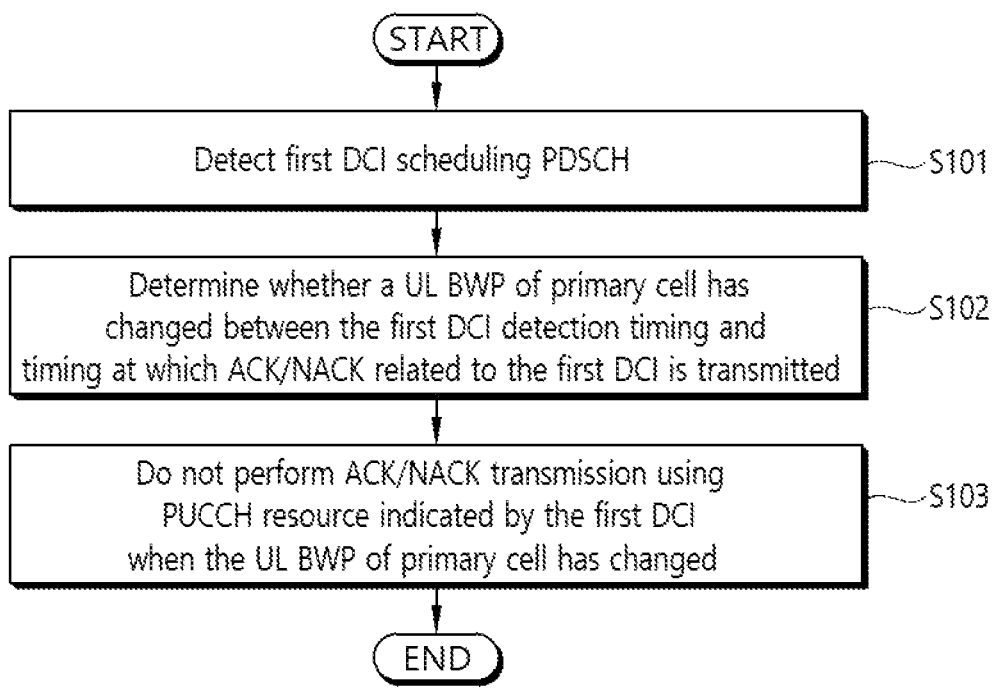
FIG. 10 shows a HARQ operation method according to an embodiment of the present disclosure.

FIG. 10 shows a HARQ operation method according to an embodiment of the present disclosure.

Referring to FIG. 10, a UE detects first DCI that schedules a PDSCH (S101). For example, the first DCI may be DCI format 1_1. The UE determines whether an uplink bandwidth part of a primary cell has been changed between a timing at which the first DCI is detected and a timing at which ACK/NACK related to the first DCI is transmitted (S102).

For example, the UE receives second DCI (e.g., DCI format 0_1) and the second DCI may indicate change of the uplink bandwidth part of the primary cell. More specifically, a bandwidth part indicator included in the second DCI may indicate an uplink bandwidth part of the primary cell other than the current uplink bandwidth part of the primary cell and uplink bandwidth part change can be detected on the basis of indication of the bandwidth part indicator.

By the way, uplink bandwidth part change based on the second DCI may be applied in a time duration between a timing at which the first DCI is detected and a timing at which ACK/NACK related for the first DCI is transmitted according to circumstances.

In this manner, when the uplink bandwidth part of the primary cell is changed in the aforementioned time duration, the UE may not perform ACK/NACK transmission using PUCCH resources indicated by the first DCI (S103).

For example, when the UE changes UL BWPs between a timing at which DCI scheduling a PDSCH (DCI that schedules a PDSCH) is received (detected) and a timing at which HARQ-ACK feedback corresponding thereto is transmitted with respect to a paired spectrum of a future system such as NR, the UE may not expect HARQ-ACK feedback transmission. That is, when the UE changes a UL BWP between a timing of a reception(detection) of the DCI that schedules a PDSCH and a timing of a corresponding PUCCH transmission with HARQ-ACK information, the UE may not perform HARQ-ACK feedback transmission.

The reason is that scheduling information of the DCI may not be suitable because a UL BWP (e.g., first UL BWP) on the assumption that there is a PUCCH resource that will carry ACK/NACK for the PDSCH scheduled by the DCI and an actual UL BWP (e.g., second UL BWP) which will carry HARQ-ACK feedback are changed according to the UL BWP change.

More specifically, the UE may not perform HARQ-ACK feedback transmission only when the UE changes a UL BWP in a PCell (primary cell) or a cell in which a PUCCH is transmitted between a timing at which DCI that schedules a PDSCH is received (detected) and a timing at which HARQ-ACK feedback corresponding thereto is transmitted. On the other hand, when a UL BWP corresponding to PUCCH transmission is not changed even though a UL BWP of an SCell is changed between a timing at which DCI scheduling a PDSCH (DCI that schedules a PDSCH) is received (detected) in the SCell and a timing at which HARQ-ACK feedback corresponding thereto is transmitted, the UE can transmit HARQ-ACK feedback.

In addition, HARQ-ACK feedback may be transmitted through a PUCCH resource indicated by DCI scheduling a PDSCH according to circumstances. For example, HARQ-ACK feedback may be transmitted in a PUCCH resource for CSI reporting or a PUCCH resource for SR. In addition, the HARQ-ACK feedback may be transmitted through a PUSCH. In such a situation, information about a PUCCH resource indicated in DCI may be irrelevant to a situation in which a valid time has elapsed as UL BWPs change. Characteristically, in the aforementioned situation, HARQ-ACK feedback transmission can be expected even when the UE changes UL BWPs for a PUCCH transmission cell between a timing at which DCI scheduling a PDSCH is received and a timing at which HARQ-ACK feedback corresponding thereto is transmitted. More characteristically, if the UE changes UP BWPs at a timing when HARQ-ACK feedback transmission is performed (if the timing corresponds to a retuning gap), transmission of a PUCCH and/or a PUSCH may not be performed irrespective of the aforementioned situations.

When simultaneous transmission of a PUCCH and a PUSCH is configured and the PUCCH and the PUSCH are transmitted at the same time, and when the PUCCH is transmitted on the basis of a PUCCH resource indicated by DCI, the UE may drop PUCCH transmission and transmit UCI of the PUCCH through the PUSCH if the UE changes UP BWPs between a timing at which the corresponding DCI is received and a timing at which the PUCCH indicated by the DCI is transmitted.

Next, specific examples of a case in which UCI transmission continues without being dropped as UL BWPs change is described. That is, examples of situations in which a PUCCH configuration and/or resources are automatically changed for each UL BWP during UL BWP change are described. More specifically, the aforementioned configuration may be composed of a PUCCH resource index, a PUCCH start symbol, a PUCCH symbol duration, a PRB location and/or hopping information.

In the case of SPS resources, HARQ-ACK resources may be semi-statically configured for each UL BWP. Accordingly, HARQ-ACK transmission for an SPS PDSCH can be performed on the basis of a semi-static configuration even if an active UL BWP differs from a UL BWP in which a PUCCH will be transmitted for the PDSCH transmitted through an SPS method (SPS PDSCH).

Similarly, a scheduling request (SR) can be transmitted according to resources of an active UL BWP at a time when the SR is triggered, and it can be assumed that SR transmission is not dropped due to the influence of BWP switching in a period other than a specific gap such as tuning latency/measurement gap.

A sounding reference signal (SRS) can also be transmitted irrespective of active BWPs, and presence or absence of a gap and latency can be determined differently according to active UL BWPs.

In the case of transmission of periodic CSI or semi-persistent CSI, it can be assumed that CSI transmission is performed through an active UL BWP during measurement of a DL BWP including (corresponding to) a measurement reference signal (RS) (i.e., an active UL BWP at reference resource timing). If the corresponding UL BWP changes at an actual transmission time, CSI can be dropped. Otherwise, CSI can be transmitted if reporting configuration of the UL BWP is linked to a current active DL BWP and dropped if not.

In the case of aperiodic or semi-static CSI transmission, when a UL BWP changes at a trigger timing and a transmission timing, UL BWP change is processed as an error and PUSCH transmission can be dropped or the CSI can be dropped. In this case, a case in which aperiodic (AP)-CSI trigger can be transmitted simultaneously with UL BWP switching may not be regarded as an error exceptionally. In this case, CSI can be transmitted in a new UL BWP. That is, in the case of UL BWP switching, it can be assumed that PUSCHs scheduled for different UL BWPs are not generated simultaneously or at different timings.

Triggering of aperiodic-CSI (AP-CSI) may be transmitted through DL scheduling DCI or a UL grant. In the case of transmission through the DL scheduling DCI, transmission of a PUSCH or a PUCCH on the basis of a UL BWP activated at the corresponding timing is assumed, and when the UL BWP changes, it is regarded as an error and CSI can be dropped. In the case of transmission through a UL grant, the above-described method is used.

Characteristically, a slot period, a slot offset, a symbol offset and/or a symbol period for an SR, an SRS or a CSI reporting resource can be set irrespective of UL BWP change. If UL BWPs have different subcarrier spacings and/or numerology configurations, periods and offsets can be scaled such that they are maintained to be identical between UL BWPs from the viewpoint of absolute time. For example, if a period is 1 slot in a first UL BWP having a subcarrier spacing of 15 kHz, the period can change to 2 slots when the UL BWP changes to a second UL BWP having a subcarrier spacing of 30 kHz.

The aforementioned HARQ-ACK feedback transmission conditions need to be also defined for an unpaired spectrum. First, similarly to a paired spectrum, HARQ-ACK feedback transmission can be expected when a UE does not change a DL/UL BWP of a PCell (or PSCell or PUCCH cell) between a DCI scheduling PDSCH (DCI that schedules a PDSCH) reception timing and a HARQ-ACK feedback transmission timing. Additionally, the UE can expect HARQ-ACK feedback transmission when HARQ-ACK feedback is transmitted through a UL BWP linked to a DL BWP indicated by DCI scheduling a PDSCH (DCI that schedules a PDSCH) in a PCell (or PSCell or PUCCH cell). In an unpaired spectrum, when a DL BWP changes, a UL BWP also changes to a UL BWP corresponding to the DL BWP. That is, a BWP corresponding to a PUCCH resource indicator can be a UL BWP linked to a DL BWP indicated by DCI scheduling a PDSCH (DCI that schedules a PDSCH) in an unpaired spectrum. Here, when a UE changes a DL/UL BWP again between PDSCH transmission and a PUCCH transmission, HARQ-ACK feedback (on HARQ-ACK PUCCH resources) may not be expected.

The UE may change a DL/UL BWP when a BWP indicator is detected from another piece of DCI or when a default timer expires and thus the DL/UL BWP changes to a default DL/UL BWP. When HARQ-ACK feedback is transmitted through PUCCH resources for CSI reporting, PUCCH resources for an SR and/or a PUSCH scheduled by a UL grant, the UE can expect HARQ-ACK feedback transmission even in a situation in which the UL BWP changes.

More characteristically, in an unpaired spectrum situation, PUCCH resources indicated through DCI including DL assignment of a PCell may correspond to a UL BWP linked to a DL BWP indicated in the DCI. Further, PUCCH resources indicated through DCI including DL assignment of a PSCell may correspond to a UL BWP linked to a DL BWP indicated in the DCI. Further, PUCCH resources indicated through DCI including DL assignment of a PUCCH-SCell may correspond to a UL BWP linked to a DL BWP indicated in the DCI. In addition, PUCCH resources indicated through DCI including DL assignment for an SCell may correspond to an active UL BWP of a cell which can transmit a PUCCH in the same PUCCH group as that of the SCell at a timing when the DCI is received.

UE Operation During Dynamic BWP Switching

As described above, in future systems (e.g., NR), a scheduled BWP can be dynamically changed through DCI indication. A retuning time required for BWP switching may depend on a UE. A base station can set/indicate a transmission timing when a PDSCH or a PUSCH is scheduled such that a processing time is sufficient for each UE in consideration of the retuning time.

Figure 11:
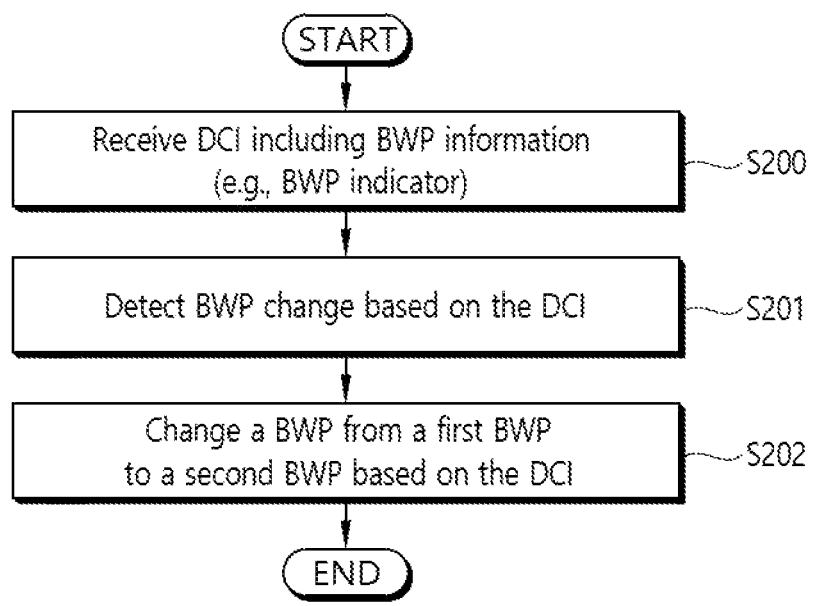
FIG. 11 illustrates a method of operating a UE during dynamic BWP switching.

FIG. 11 illustrates a method of operating a UE during dynamic BWP switching.

Referring to FIG. 11, the UE receives downlink control information (DCI) including bandwidth part (BWP) information (e.g., a bandwidth part indicator) (S200). The DCI may be DCI format 0_1 or DCI format 1_1, for example. This will be described in detail later.

The UE can detect bandwidth part (BWP) change on the basis of the DCI (S201). That is, the UE detects downlink control information (DCI) indicating (informing) bandwidth part (BWP) change. The UE changes bandwidth parts from a first bandwidth part to a second bandwidth part on the basis of the DCI (S202). Here, a second bandwidth part application timing becomes an issue, which will be described in detail below.

The bandwidth part change may be DL BWP change (switching) or UL BWP change (switching). For example, the UE can receive DCI format 1_1 and perform DL BWP change on the basis of DCI format 1_1. That is, the aforementioned DCI may be DCI format 1_1. DCI format 1_1 is a format used for PDSCH scheduling in a cell and may include a bandwidth part indicator. The bandwidth part indicator may be 0, 1 or 2 bits and can indicate one of a plurality of DL BWPs set by a higher layer. When the UE does not support active BWP change through DCI, this field can be ignored. The bandwidth part indicator can signal DL BWP change by indicating a BWP other than the current active BWP. For example, when a DL bandwidth part indicated by the bandwidth part indicator is not a current DL bandwidth part, the UE can detect DL bandwidth part change. DCI format 1_1 includes a time domain resource assignment field. This field relates to time domain resource assignment for a PDSCH. Specifically, the time domain resource assignment field value provides a specific row index of a resource assignment table, and the row defines at least one of a slot offset, a start symbol, an assignment length and a PDSCH mapping type related to PDSCH reception. That is, a slot through which a PDSCH will be received, a start symbol at which the PDSCH will be received in the slot, the number of symbols through which the PDSCH will be received (which may be represented as a time period or a time duration), and the like can be ascertained according to the time domain resource assignment field value.

Alternatively, the UE may receive DCI format 0_1 and perform UL BWP change on the basis of DCI format 0_1. That is, the aforementioned DCI may be DCI format 0_1. DCI format 0_1 is a DCI format used for PUSCH scheduling in a cell and may include a bandwidth part indicator. The bandwidth part indicator may be 0, 1 or 2 bits and can indicate one of a plurality of UL BWPs set by a higher layer. When the UE does not support active BWP change through DCI, this field can be ignored. The bandwidth part indicator can signal DL BWP change by indicating a BWP other than the current active BWP. For example, when a UL bandwidth part indicated by the bandwidth part indicator is not a current UL bandwidth part, the UE can detect bandwidth part change. DCI format 0_1 includes a time domain resource assignment field. This field relates to time domain resource assignment for a PUSCH. Specifically, the time domain resource assignment field value provides a specific row index of a resource assignment table, and the row defines at least one of a slot offset, a start symbol, an assignment length and a PDSCH mapping type related to PUSCH reception.

Meanwhile, a timing at which a changed bandwidth part is applied may become an issue. For example, if it is not clearly defined whether a changed BWP is applied from a timing at which the DCI is detected or a specific timing after the DCI is detected, ambiguity may be generated.

In the present disclosure, a changed BWP can be applied from a slot or a symbol carrying a PDSCH scheduled by DCI in the case of DL BWP switching. If a time required for DL BWP switching is insufficient, a UE can skip PDCCH monitoring and/or PDSCH decoding by the corresponding time duration. More characteristically, when DL channel reception is skipped in some symbols, detection/decoding of the corresponding DL channel may not be expected when a DMRS is not secured. This is because correct decoding cannot be performed due to absence of channel estimation when even a part of a DMRS is not secured. When a PDCCH still indicating BWP switching is detected in the above case, NACK can be set as HARQ-ACK feedback even when corresponding PDSCH transmission is actually skipped. In the case of an unpaired spectrum, UL transmission may not be performed for a corresponding DL reception/detection skip period.

Figure 12:
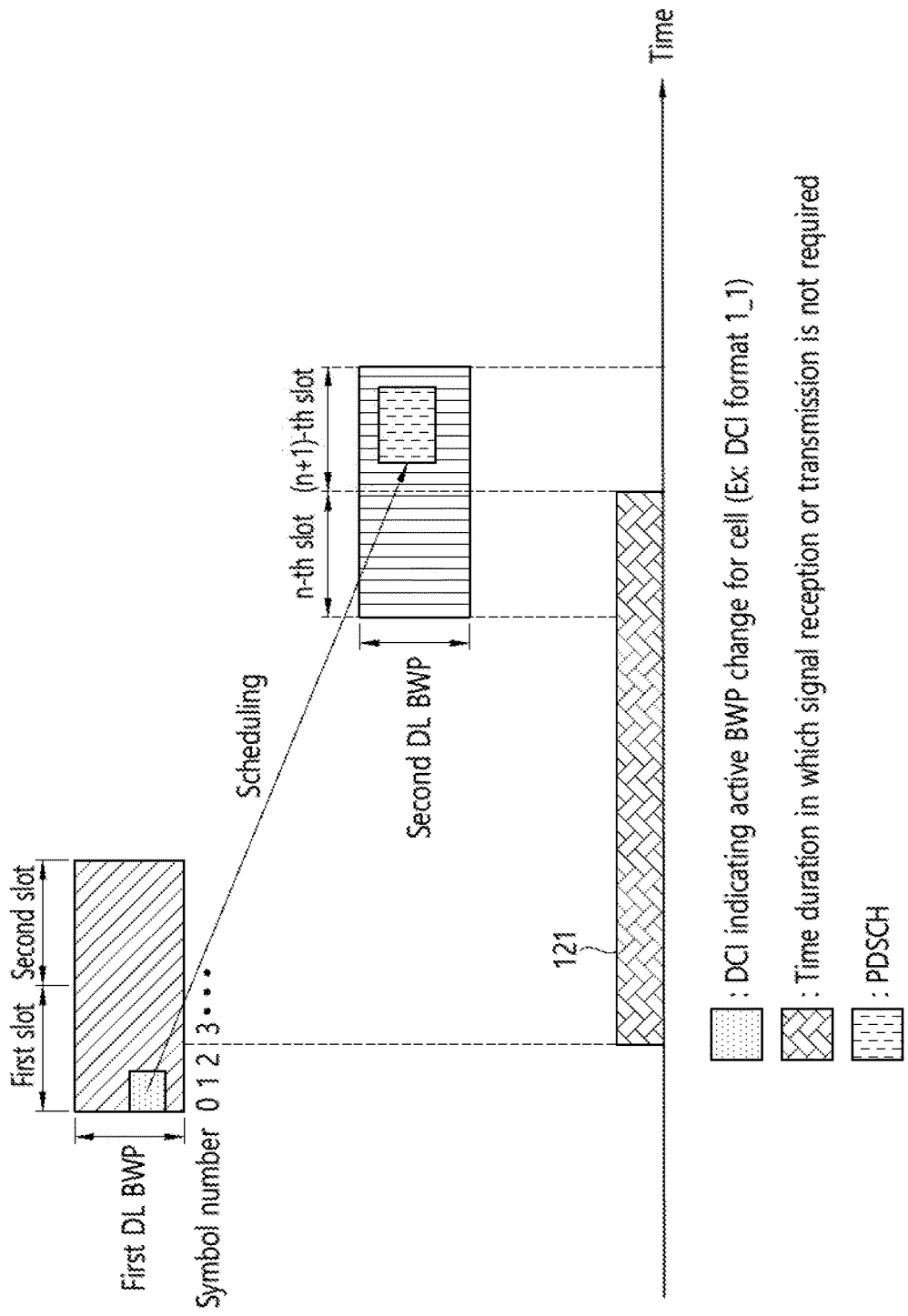
FIG. 12 shows an example in which BWP change is applied.

FIG. 12 shows an example in which BWP change is applied.

Referring to FIG. 12, a UE may be in a state in which a first DL BWP is activated. The UE can detect (receive) DCI (e.g., DCI format 1_1) indicating active BWP change for a cell in the first DL BWP. The DCI can be received through a PDCCH. For example, the UE can detect the DCI in a first slot in the time domain.

For example, it is assumed that the DCI indicates active BWP change to a second DL BWP. In addition, it is assumed that a PDSCH scheduled by the DCI is positioned in an (n+1)-th slot. Here, the DCI can indicate the (n+1)-th slot through the time domain resource assignment field.

In such a case, the UE may not receive/transmit a signal (reception/transmission of a signal may not be required) in a time duration 121 from a specific symbol (e.g. the third symbol) of the first slot in which the PDCCH is received to the start of a slot (the (n+1)-th slot) indicated by a slot offset value of the time domain resource assignment field of the DCI. The UE can skip PDCCH monitoring and/or PDSCH decoding in the time duration 121. This can be assumed that the UE applies the changed second DL BWP from the start of the (n+1)-th slot in which the PDSCH is located even if the PDSCH does not start from the first symbol of the (n+1)-th slot. That is, BWP change is applied in units of slot.

Similarly, in the case of UL BWP switching through DCI, application of a changed BWP from a slot through which a PUSCH scheduled by the DCI (e.g., DCI format 0_1) is transmitted can be considered. The UE may not be required to receive or transmit a signal for a time duration from the third symbol of a slot in which a PDCCH including the DCI is received to the start of a slot indicated by a slot offset value of the time domain resource assignment field of the DCI. That is, the UE can skip PUSCH transmission, PUCCH transmission and/or SRS transmission in the time duration.

Alternatively, the UE may not expect a situation in which a time required for DL BWP switching is insufficient when conforming to indicated or set PDCCH-to-PDSCH timing. More characteristically, if DL BWP switching returns to a default BWP when a default timer expires, the default BWP can be applied from a timer unit (a slot or a bin in units of 0.5 ms in the time domain) in which the timer expires, the next timer unit (a slot or a bin in units of 0.5 ms in the time domain) or an earliest monitoring occasion after the timer expires. That is, PDCCH monitoring can be performed in the changed BWP from the corresponding slot.

In addition, execution of measurement (using CSI, reference signal received power (RSRP), radio link monitoring (RLM) or radio link failure (RLF) reference resources) on the basis of an indicated BWP from the corresponding slot can be considered. Alternatively, a default BWP application timing may be determined on the basis of a longest time between a PDCCH from among time domain resource assignment values set for the corresponding UE and a PDSCH corresponding to the PDCCH. This can be regarded as consideration of the worst case of BWP switching when time domain resource assignment is set, and in the case based on the timer, a BWP application timing is set to the worst case because information about the BWP application timing cannot be additionally received. More characteristically, the aforementioned method can be limited to a paired spectrum case. In the case of an unpaired spectrum, information about UL BWP switching also needs to be considered and thus a default BWP application timing may be determined on the basis of a longest time between a PDCCH from among time domain resource assignment values set for the corresponding UE and a PDSCH corresponding to the PDCCH and a longest time between the PDCCH and a PUSCH corresponding thereto.

A UE can perform PDCCH monitoring in a BWP in which DCI is transmitted in a time duration from a PDCCH monitoring occasion or slot in which the DCI is transmitted to a slot in which a PDSCH is transmitted or a starting allocated symbol. Furthermore, CSI measurement (measurement resources and the like) can be assumed on the basis of a BWP in which DCI is transmitted. When a retuning time is considered, PDCCH monitoring or CSI measurement may be skipped several symbols before a PDSCH transmitted in a changed BWP. More characteristically, when a BWP changes, PDCCH monitoring may be skipped in a slot in which a PDSCH is transmitted or in a monitoring occasion in advance of the PDSCH in the slot in which the PDSCH is transmitted.

Alternatively, an indicated BWP may be applied from the next slot or next monitoring occasion following a time at which the UE detects a BWP indicator. In this case, PDCCH monitoring and/or measurement may assume the BWP indicated from the corresponding time.

In the case of UL BWP switching, application of an indicated BWP from a PUSCH transmission slot scheduled by DCI can be considered. That is, a PUCCH configured by a higher layer may be transmitted in the indicated BWP from the corresponding slot. Furthermore, (CSI) reporting setting may be assumed on the basis of the indicated BWP from the corresponding slot. Similarly, the UE may not transmit a PUCCH and/or an SRS configured by a higher layer several symbols before a PUSCH transmission symbol in consideration of a retuning time.

More characteristically, in the case of an unpaired spectrum, if DL BWP switching returns to a UL BWP linked to a default DL BWP when a default timer expires, the changed BWP can be applied from a timer unit (a slot or a bin in units of 0.5 ms in the time domain) in which the timer expires, the next timer unit (a slot or a bin in units of 0.5 ms in the time domain) or an earliest UL symbol after the timer expires.

Even though a time required for UL BWP switching is insufficient, the UE can skip PUSCH transmission, PUCCH transmission and/or SRS transmission by the corresponding time duration. More characteristically, if (at least some) DMRS transmission is not secured when UL channel transmission in some symbols is skipped, entire UL channel transmission can be skipped because transmission may be meaningless due to absence of channel estimation when a DMRS is not secured. Alternatively, the UE may not expect a situation in which a time required for DL BWP switching is set to be insufficient at an indicated or set PDCCH-to-PDSCH timing.

Alternatively, an indicated BWP may be applied from the next slot or the next UL symbol following a time at which the UE detects a BWP indicator. In this case, a PUCCH and/or an SRS configured by a higher layer may assume the indicated BWP from the corresponding time. More characteristically, in the case of UL BWP switching, a BWP application timing may be delayed on the basis of a TA value or a maximum TA value of the corresponding UE in consideration of TA.

When the UE operates a timer for returning to a default BWP, the timer increases when DCI format 1_1 is not detected in a paired spectrum and when DCI format 1_1 or DCI format 0_1 is not detected in an unpaired spectrum, in general during a timer unit (a slot or 0.5 ms).

If another DL or UL BWP is indicated in the aforementioned DCI, an operation of returning to the default BWP between a timing at which the DCI is transmitted and a timing at which a PDSCH or a PUSCH is transmitted in a new BWP may be unnecessary. Accordingly, the timer for returning to the default BWP may be maintained without increasing between the timing at which the DCI is transmitted and the timing at which the PDSCH or PUSCH is transmitted i) when DCI format 1_1 indicates DL BWP switching in a paired spectrum and ii) when DCI format 1_1 or DCI format 0_1 indicates DL/UL BWP switching in an unpaired spectrum. That is, in the aforementioned case, the timer is not increased even if DCI format 1_1 and/or DCI format 0_1 are not detected.

Figure 13:
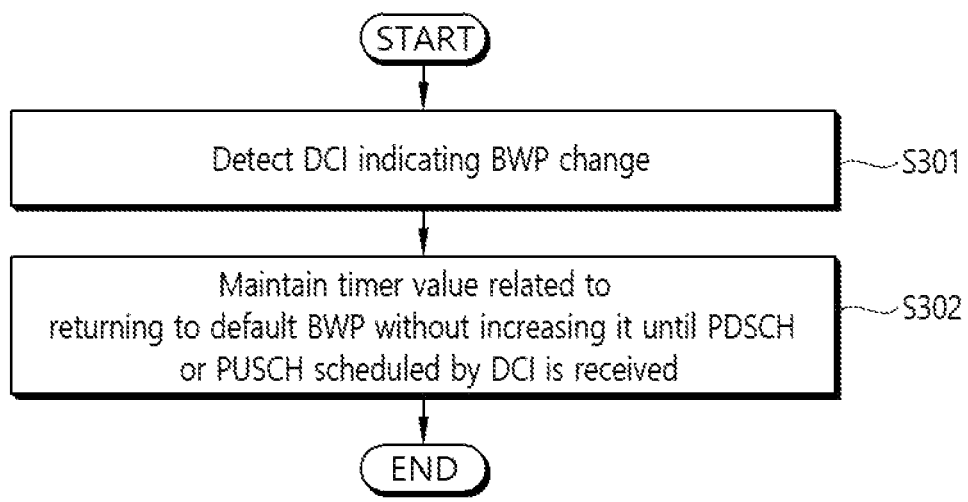
FIG. 13 illustrates a timer operation associated with BWP change.

FIG. 13 illustrates a timer operation associated with BWP change.

Referring to FIG. 13, DCI indicating BWP change is detected (S301).

A UE can maintain a timer value related to returning to a default BWP without increasing it until a timing at which a PDSCH or a PUSCH scheduled by the DCI is received (S302).

Alternatively, the timer is counted on the basis of DCI detection, and when the timer expires between the timing at which the DCI indicating DL BWP switching is received and the timing at which the PDSCH or PUSCH is transmitted, returning to the default BWP may not be performed in the corresponding duration.

It can be assumed that a timing at which an active DL BWP changes is the same as a timing at which an active UL BWP changes in the case of an unpaired spectrum. Here, in the case of different numerologies between DL and UL, they may be adjusted to be identical on the basis of the absolute time.

DCI Sizes in Different BWPs

In determination of a DCI size, various factors affect the DCI size. Firstly, enabled characteristics (e.g., CBG retransmission, time domain RA size, and the like) need to be clearly determined for corresponding DCI. Secondly, a bandwidth that can be referred to by DCI for scheduling needs to be determined, and the bandwidth can define a frequency domain RA field size. Finally, a padding size needs to be determined on the basis of alignment between different DCI formats.

The following DCI formats can be defined.

1) DCI format 0_0: fallback DCI-UL grant, 2) DCI format 0_1: UL grant, 3) DCI format 1_0: fallback DCI-DL scheduling DCI, 3) DCI format 1_1: DL scheduling DCI, 4) DCI format 2_0: SFI, 5) DCI format 2_1: PI, 6) DCI format 2_2: TPC, 7) DCI format 2_3: TCP for SRS A DCI size can be set for at least the DCI format 2 group. Accordingly, the DCI size can be set to be the same as or different from that for DCI format 1_0. Since the size of DCI format 1_0 may depend on an active DL/UL BWP, addition of an entry indicating "the same size as that of DCI format 1_0 including a padding bit" may be considered in setting of a DCI size.

Proposal 1: A DCI size of the DCI format 2 group may be the same as or different from that of DCI format 1_0. To designate different DCI sizes of DCI format 1_0 in different BWPs, an entry for aligning the DCI format 2 group and DCI format 1_0 including a padding bit can be added.

Proposal 2: fallback DCI for downlink scheduling, DCI format scheduling RMSI (remaining minimum system information), OSI (other system information), RAR (random access response), Msg4 (message 4) are format 1_0. The sizes of format 1_0 having different RNTIs are identical.

To have the same size between DCI formats 1_0 having SI-RNTI/RA-RNTI in a BWP, frequency domain resource assignment field sizes need to be aligned. The simplest method is to assume the bandwidth of the current active DL BWP. However, this will limit sharing of broadcast scheduling DCI between UEs for which BWPs having the same bandwidth are configured.

Another approach is to set an individual frequency/BW at which broadcast scheduling DCI that may be different from that for the current active DL BWP (or equal to or less than the active DL BWP) can be scheduled.

In this case, to align DCI sizes between UEs having different BWP configurations, a maximum value of a frequency domain RA field size for DCI format 1_0 can be set. This can be set through higher layer signaling.

Proposal 3: A bandwidth and a frequency region that can be scheduled by DCI format 1_0 having SI-RNTI, RA-RNTI and P-RNTI can be set in CORESET configuration of each DL BWP except RMSI CORESET. If they are not set, the current active DL BWP is assumed to be the corresponding bandwidth/frequency region.

Proposal 4: A frequency domain RA field size used in DCI format 1_0 can be set. If it is not set, the field size is determined by the bandwidth of the current active DL BWP.

In addition, the size of DCI format 1_0 may be aligned with DCI format 0_0. Which UL BWP is scheduled by DCI needs to be clarified with respect to a frequency region/bandwidth for DCI format 0_0. For example, the current active UL BWP can be assumed. However, the DCI size of DCI format 0_0 may change according to UL BWP change. To prevent this, the RA field size for DCI format 0_0 can be regarded as "maximum RA field size" among configured UL BWPs.

To align DCI format 0_0 with DCI format 1_0 shared by a plurality of UEs having different BWPs, min {RA field size set for DCI format 1_0+k, maximum RA field size among UL BWPs} can be considered. Since DCI format 1_0 may have a larger number of fields than DCI format 0_0, the RA field size of DCI format 0_0 may increase by a gap k (e.g., k=6 or 7 according to SUL configuration) bits from the RA field size of DCI format 1_1.

Proposal 5: in the case of DCI format 0_0, the RA field size can be determined in consideration of a configured UL BWP and DCI format 1_0. The RA field size of DCI format 0_0 can be defined as min{RA field size set for DCI format 1_0+k, maximum RA field size among UL BWPs}. Here, k bits may be a difference between DCI format 1_0 and DCI format 0_0 for which the same RA field size is assumed.

To avoid RRC configuration, an approach is to define a frequency domain of an active DL BWP as a PRB set from the lowest PRB of the active DL BWP and to assume that a fixed RA field size is used for format 1_0.

According to the present disclosure, it is possible to improve resource utilization efficiency of a network using active BWPs in an unpaired spectrum.

Figure 14:
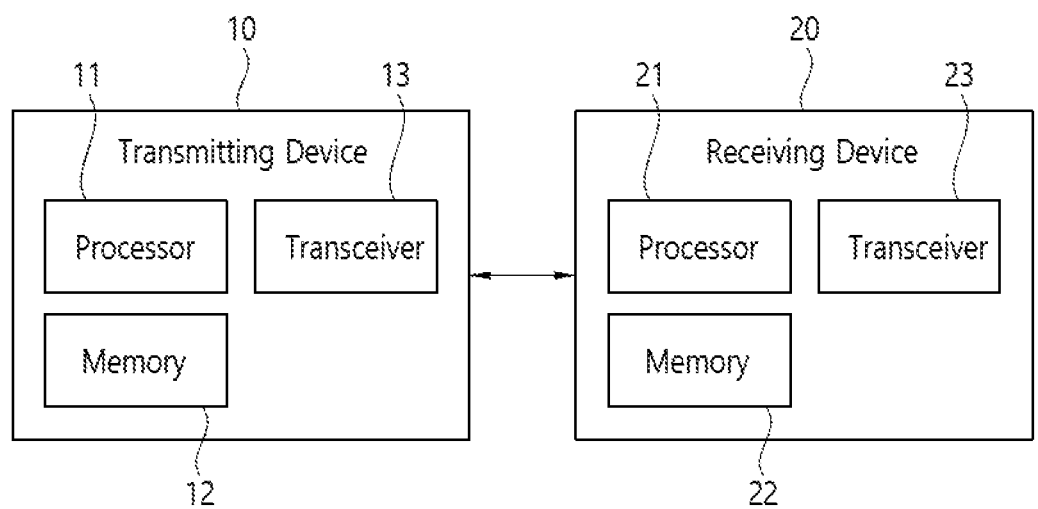
FIG. 14 is a block diagram showing components of a transmission device 10 and a reception device 20 which perform the present disclosure.

FIG. 14 is a block diagram showing components of a transmission device 10 and a reception device 20 which perform the present disclosure. Here, each of the transmission device and the reception device may be a base station or a UE.

The transmission device 10 and the reception device 20 may respectively include transceivers 13 and 23 capable of transmitting or receiving radio signals carrying information and/or data, signals, messages and the like, memories 12 and 22 storing various types of information related to communication in a wireless communication system, and processors 11 and 21 connected to components such as the transceivers 13 and 23 and the memories 12 and 22 and configured to control the memories 12 and 22 and/or the transceivers 13 and 23 such that the corresponding devices perform at least one of the embodiments of the present disclosure.

The memories 12 and 22 can store programs for processing and control of the processors 11 and 21 and temporarily store input/output information. The memories 12 and 22 may be used as buffers.

The processors 11 and 21 generally control overall operations of various modules in the transmission device and the reception device. Particularly, the processors 11 and 21 can execute various control functions for performing the present disclosure. The processors 11 and 21 may also be called controllers, microcontrollers, microprocessors, microcomputers and the like. The processors 11 and 21 can be realized by hardware, firmware, software or a combination thereof. When the present disclosure is implemented using hardware, ASICs (application specific integrated circuits), DSPs (digital signal processors), DSPDs (digital signal processing devices), PLDs (programmable logic devices), FPGAs (field programmable gate arrays) or the like configured to perform the present disclosure may be included in the processors 11 and 21. When the present disclosure is implemented using firmware or software, firmware or software can be configured to include modules, procedures, functions or the like which perform functions or operations of the present disclosure, and the firmware or software configured to perform the present disclosure can be included in the processors 11 and 21 or stored in the memories 12 and 22 and executed by the processors 11 and 21.

The processor 11 of the transmission device 10 may perform predetermined coding and modulation on a signal and/or data which will be transmitted to the outside and then transmit the coded and modulated signal or data to the transceiver 13. For example, the processor 11 can generate a codeword by performing demultiplexing, channel coding, scrambling and modulation on a data string to be transmitted. The codeword can include information equivalent to transport blocks that are data blocks provided by a MAC layer. One transport block (TB) can be coded into one codeword. Each codeword can be transmitted to the reception device through one or more layers. For frequency up-conversion, the transceiver 13 may include an oscillator. The transceiver 13 may include one or more plurality of transmission antennas.

A signal processing procedure of the reception device 20 may be reverse to the signal processing procedure of the transmission device 10. The transceiver 23 of the reception device 20 can receive radio signals transmitted from the transmission device 10 under the control of the processor 21. The transceiver 23 may include one or more reception antennas. The transceiver 23 can frequency-downconvert each signal received through the reception antenna to restore a baseband signal. The transceiver 23 may include an oscillator for frequency downconversion. The processor 21 can restore data to be intended to be transmitted by the transmission device 10 by performing decoding and demodulation on radio signals received through the reception antenna.

The transceivers 13 and 23 may include one or more antennas. The antennas can serve to transmit signals processed by the transceivers 13 and 23 to the outside or receive external radio signals and transmit the radio signals to the transceivers 13 and 23 according to an embodiment under the control of the processors 11 and 21. The antennas may also be called antenna ports. Each antenna may correspond to one physical antenna or may be configured by a combination of two or more physical antennas. A signal transmitted from each antenna cannot be decomposed any more by the reception device 20. A reference signal (RS) transmitted corresponding to an antenna defines the antenna from the viewpoint of the reception device 20 and enables the reception device 20 to perform channel estimation for the antenna irrespective of whether a channel is a single radio channel from a physical antenna or a composite channel from a plurality of physical antenna elements including the antenna. That is, an antenna can be defined such that a channel carrying symbols on the antenna can be derived from a channel carrying other symbols on the same antenna. A transceiver which supports a multi-input multi-output (MIMO) function for transmitting/receiving data using a plurality of antennas can be connected to two or more antennas.

Figure 15:
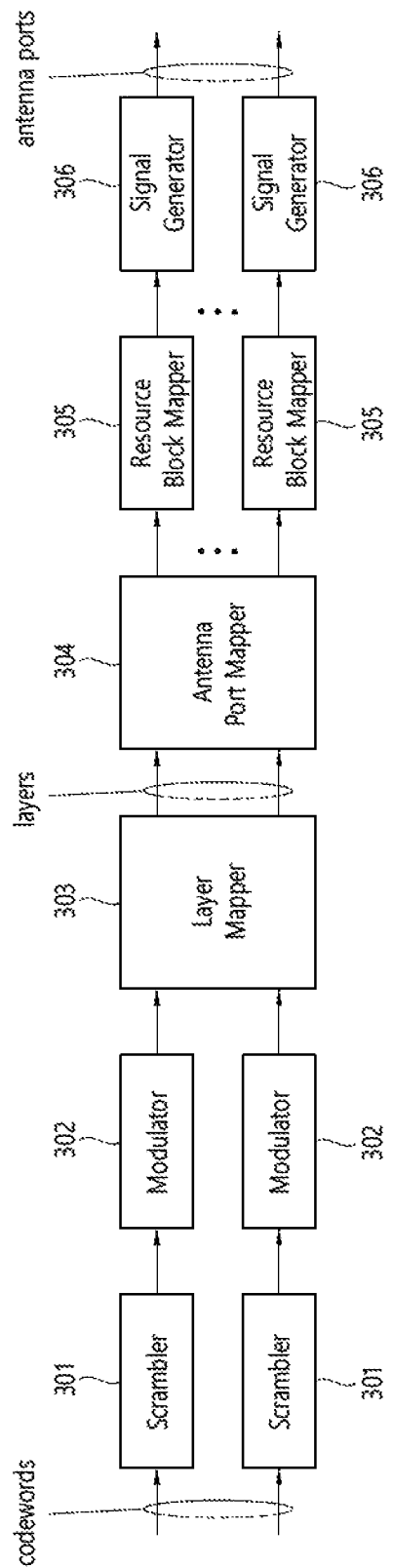
FIG. 15 illustrates an example of a signal processing module structure in the transmission device 10.

FIG. 15 illustrates an example of a signal processing module structure in the transmission device 10. Here, signal processing can be performed by a processor of a base station/UE such as the processor 11 of FIG. 14.

Referring to FIG. 15, a transmission device 10 in a UE or a base station may include a scrambler 301, a modulator 302, a layer mapper 303, an antenna port mapper 304, a resource block mapper 305 and a signal generator 306.

The transmission device 10 can transmit one or more codewords. Coded bits in each codeword are scrambled by the scrambler 301 and transmitted on a physical channel. A codeword may also be referred to as a data string and may be equivalent to a transport block that is a data block provided by a MAC layer.

The scrambled bits are modulated into complex-valued modulation symbols by the modulator 302. The modulator 302 can modulate the scrambled bits according to a modulation scheme and arrange the scrambled bits as complex-valued symbols representing positions on a signal constellation. The modulation scheme is not limited, and m-PSK (m-Phase Shift Keying) or m-QAM (m-Quadrature Amplitude Modulation) may be used to module the coded data. The modulator may also be referred to as a modulation mapper.

The complex-valued modulation symbols can be mapped to one or more transport layers by the layer mapper 303. The complex-valued modulation symbols on the layers can be mapped by the antenna port mapper 304 for transmission through antenna ports.

The resource block mapper 305 can map complex-valued modulation symbols for respective antenna ports to appropriate resource elements in a virtual resource block allocated for transmission. The resource block mapper can map the virtual resource block to a physical resource block according to an appropriate mapping scheme. The resource block mapper 305 can allocate the complex-valued modulation symbols for the respective antenna ports to appropriate subcarriers and multiplex the same according to a user.

The signal generator 306 can modulate the complex-valued modulation symbols for the respective antenna ports, that is, antenna-specific symbols according to a specific modulation scheme, for example, OFDM (Orthogonal Frequency Division Multiplexing) to generate a complex-valued time domain OFDM symbol signal. The signal generator can perform IFFT (Inverse Fast Fourier Transform) on the antenna-specific symbols, and a CP (Cyclic Prefix) can be inserted into time domain symbols on which IFFT has been performed. OFDM symbols are subjected to digital-to-analog conversion, frequency upconversion and the like and transmitted to a reception device through respective transmission antennas. The signal generator may include an IFFT module, a CP insertion device, a DAC (Digital-to-Analog Converter), a frequency uplink converter, and the like.

Figure 16:
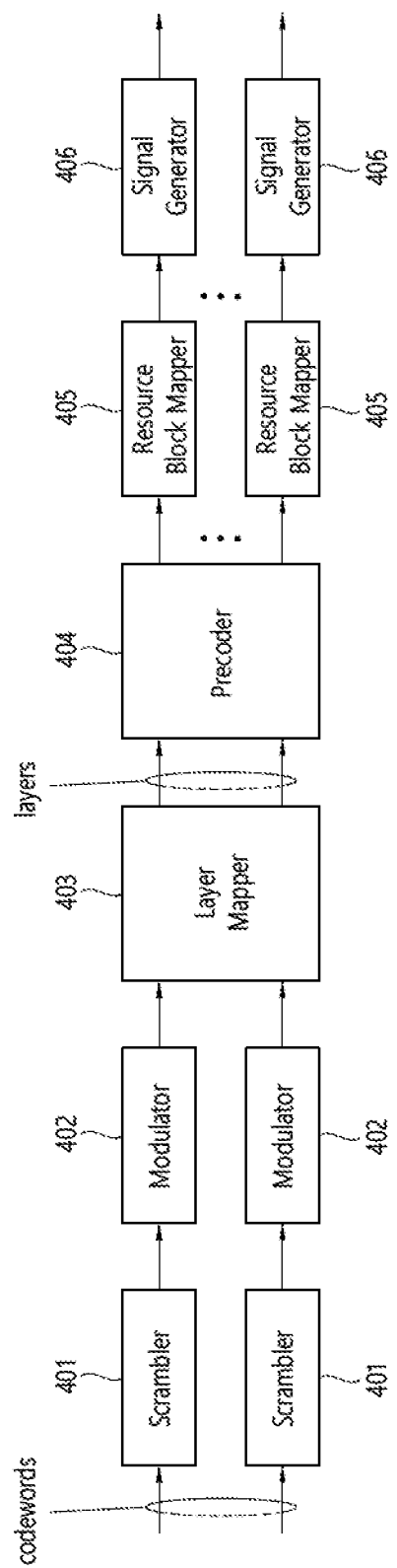
FIG. 16 illustrates another example of the signal processing module structure in the transmission device 10.

FIG. 16 illustrates another example of the signal processing module structure in the transmission device 10. Here, signal processing can be performed by a processor of a UE/base station such as the processor 11 of FIG. 14.

Referring to FIG. 16, the transmission device 10 in a UE or a base station may include a scrambler 401, a modulator 402, a layer mapper 403, a precoder 404, a resource block mapper 405 and a signal generator 406.

For a codeword, the transmission device 10 can scramble coded bits in the codeword through the scrambler 401 and then transmit the scrambled bits through a physical channel.

The scrambled bits are modulated into complex-valued modulation symbols by the modulator 402. The modulator can modulate the scrambled bits according to a predetermined modulation scheme and arrange the scrambled bits as complex-valued symbols representing positions on a signal constellation. The modulation scheme is not limited, and pi/2-BPSK (pi/2-Binary Phase Shift Keying), m-PSK (m-Phase Shift Keying) or m-QAM (m-Quadrature Amplitude Modulation) can be used to modulate the coded data.

The complex-valued modulation symbols can be mapped to one or more transport layers by the layer mapper 403.

The complex-valued modulation symbols on the layers can be precoded by the precoder 404 for transmission through antenna ports. Here, the precoder may perform precoding after performing transform precoding for the complex-valued modulation symbols. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. Output z of the precoder 404 can be obtained by multiplying output y of the layer mapper 403 by an N×M precoding matrix W. Here, N is the number of antenna ports and M is the number of layers.

The resource block mapper 405 maps complex-valued modulation symbols for respective antenna ports to appropriate resource elements in a virtual resource block allocated for transmission.

The resource block mapper 405 can allocate the complex-valued modulation symbols to appropriate subcarriers and multiplex the same according to a user.

The signal generator 406 can modulate the complex-valued modulation symbols according to a specific modulation scheme, for example, OFDM to generate a complex-valued time domain OFDM symbol signal. The signal generator 406 can perform IFFT (Inverse Fast Fourier Transform) on the antenna-specific symbols, and a CP (Cyclic Prefix) can be inserted into time domain symbols on which IFFT has been performed. OFDM symbols are subjected to digital-to-analog conversion, frequency upconversion and the like and transmitted to a reception device through respective transmission antennas. The signal generator 406 may include an IFFT module, a CP insertion device, a DAC (Digital-to-Analog Converter), a frequency uplink converter, and the like.

A signal processing procedure of a reception device 20 may be reverse to the signal processing procedure of the transmission device. Specifically, the processor 21 of the transmission device 10 decodes and modulates a radio signal received from the outside through antenna ports of the transceiver 23. The reception device 20 may include multiple reception antennas, and signals received through the reception antennas are restored into baseband signals and then restored into data strings intended to be transmitted by the transmission device 10 through multiplexing and MIMO demodulation. The reception device 20 may include a signal restoration device for restoring a received signal into a baseband signal, a multiplexer for combining and multiplexing received signals, and a channel demodulator for demodulating multiplexed signal strings into corresponding codewords. The signal restoration device, the multiplexer and the channel demodulator can be configured as an integrated module for executing functions thereof or as independent modules. More specifically, the signal restoration device may include an analog-to-digital converter (ADC) for converting an analog signal into a digital signal, a CP remover for removing a CP from the digital signal, an FFT module for applying FFT (fast Fourier transform) to the CP-removed signal to output frequency domain symbols, and a resource element demapper/equalizer for restoring the frequency domain symbols into antenna-specific symbols. The antenna-specific symbols are restored into a transport layer through the multiplexer, and the transport layer is restored into a codeword intended to be transmitted by the transmission device through the channel demodulator.

Figure 17:
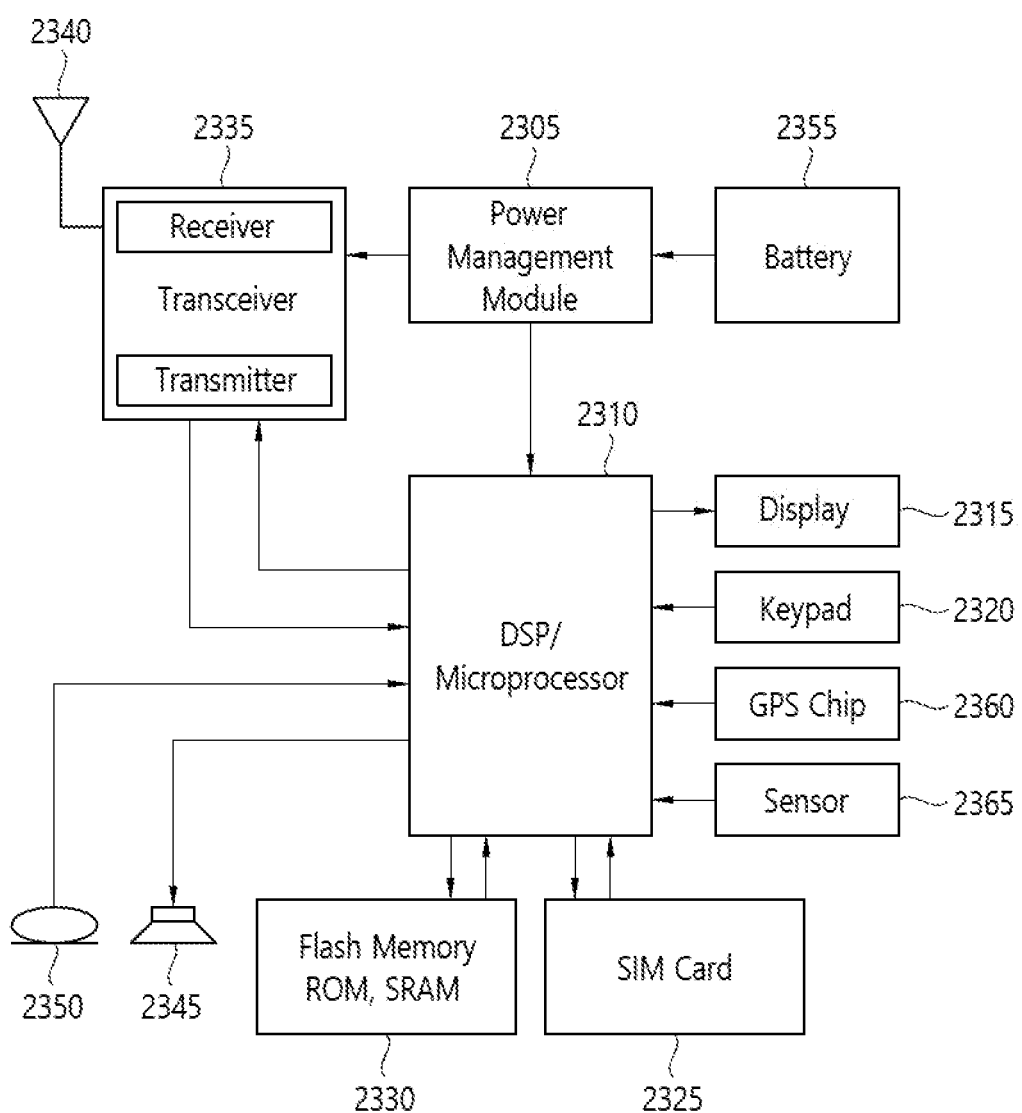
FIG. 17 illustrates an example of a wireless communication device according to an implementation example of the present disclosure.

FIG. 17 illustrates an example of a wireless communication device according to an implementation example of the present disclosure.

Referring to FIG. 17, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a GPS (Global Positioning System) chip 2360, a sensor 2365, a memory 2330, a SIM (Subscriber Identification Module) card 2325, a speaker 2345 and a microphone 2350. A plurality of antennas and a plurality of processors may be provided.

The processor 2310 can implement functions, procedures and methods described in the present specification. The processor 2310 of FIG. 17 may be the processor 11 and 21 of FIG. 14.

The memory 2330 is connected to the processor 2310 and stores information related to operation of the processor. The memory may be located inside or outside the processor and connected to the processor through various techniques such as wired connection and wireless connection. The memory 2330 of FIG. 17 may be the memory 12 and 22 of FIG. 14.

A user can input various types of information such as telephone numbers using various techniques such as pressing buttons of the keypad 2320 and activating sound using the microphone 2350. The processor 2310 can receive user information, process the user information and execute an appropriate function such as making a call using an input telephone number. Some scenarios, data may be retrieved from the SIM card 2325 or the memory 2330 in order to execute an appropriate function. In some scenarios, the processor 2310 can display various types of information and data on the display 2315 for user convenience.

The transceiver 2335 is connected to the processor 2310 and transmit/receive radio signals such as radio frequency (RF) signals. The processor can control the transceiver in order to start communication or transmit radio signals including various types of information or data such as audio communication data. The transceiver includes a transmitter and a receiver for transmitting and receiving radio signals. The antenna 2340 can facilitate transmission and reception of radio signals. In some implementation examples, when the transceiver receives a radio signal, the transceiver can forward and convert the signal into a baseband frequency for processing by the processor. The processed signal can be processed through various techniques such as conversion into audible or readable information such that it is output through the speaker 2345. The transceiver of FIG. 17 may be the transceiver 13 and 23 of FIG. 14.

Although not shown in FIG. 17, the UE may additionally include various components such as a camera and a USB (universal serial bus) port. For example, the camera can be connected to the processor 2310.

FIG. 17 shows an implementation example for the UE and the present inventio is not limited thereto. The UE need not necessarily include all components of FIG. 17. That is, some components, for example, the keypad 2320, the GSP chip 2360, the sensor 2365 and the SIM card may not be essential components, and in this case, they may not be included in the UE.

Figure 18:
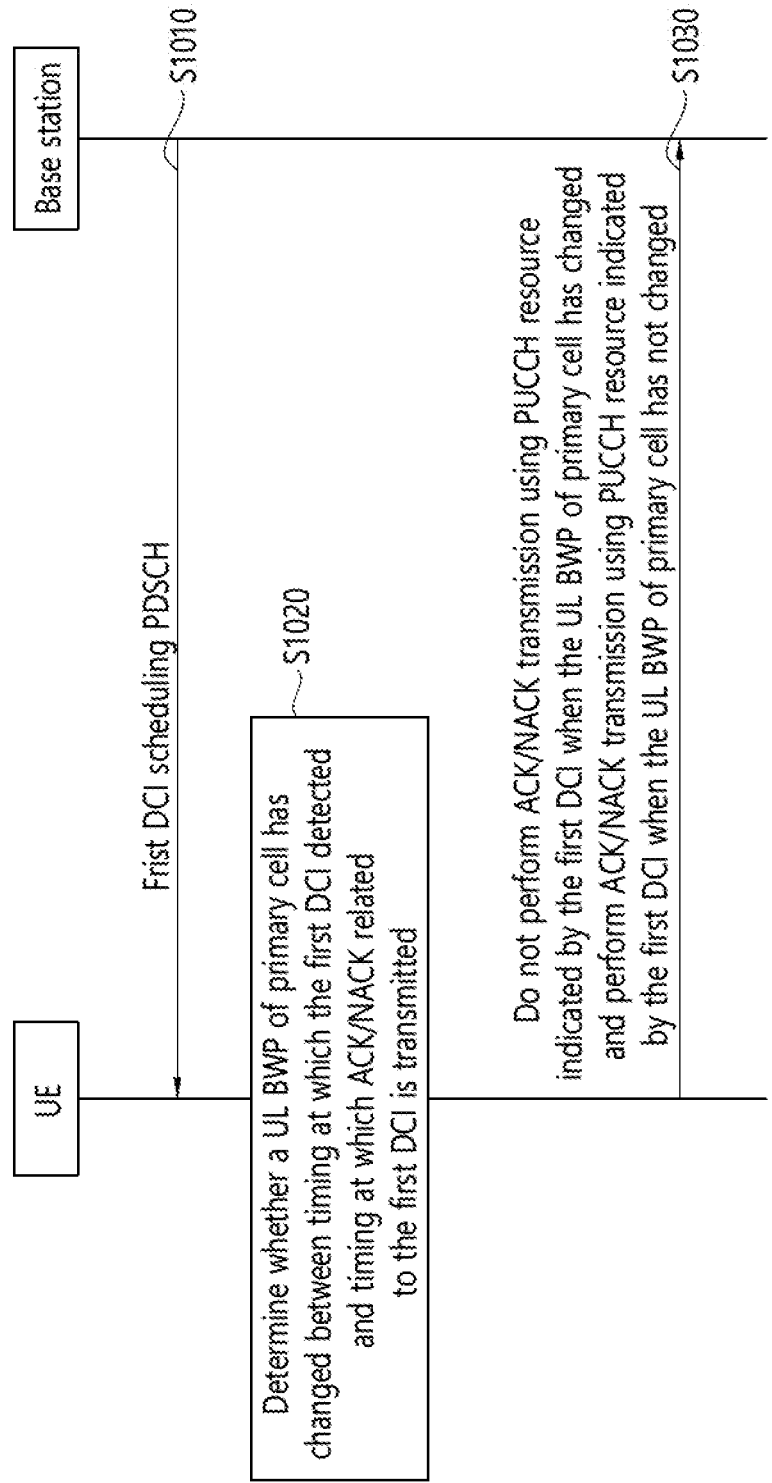
FIG. 18 shows a HARQ operation method according to an embodiment of the present disclosure.

FIG. 18 shows a HARQ operation method according to an embodiment of the present disclosure.

Referring to FIG. 18, a UE receives/detects first DCI scheduling a PDSCH from a base station (or a network) (S1010).

The UE determines whether UL BWPs of a primacy cell have changed in a time duration between a timing at which the first DCI is detected and a timing at which ACK/NACL related to the first DCI is transmitted (S1020).

The UE may not perform ACK/NACK transmission using a PUCCH resource indicated by the first DCI when the UL BWPs of the primary cell have changed in the time duration and can perform ACK/NACK transmission using the PUCCH resource indicated by the first DCI when the UL BWPs of the primary cell have not changed in the time duration (S1030).

When the UE changes UL BWPs in a time duration between a timing at which DCI scheduling a PDSCH (DCI that schedules a PDSCH) is received (detected) and a timing at which HARQ-ACK feedback corresponding thereto is transmitted for a paired spectrum in a future system such as NR, the UE may not expect HARQ-ACK feedback transmission. That is, the DCI scheduling the PDSCH may indicate a resource (e.g., PUCCH resource) in which ACK/NACK (HARQ-ACK) for the PDSCH will be transmitted. Scheduling information of the DCI may not be suitable because a UL BWP (e.g., first UL BWP) on the assumption that there is a PUCCH resource in which ACK/NACK for the PDSCH scheduled by the DCI will be transmitted and an actual UL BWP (e.g., second UL BWP) in which HARQ-ACK feedback will be transmitted change according to the UL BWP change. Accordingly, when the UE changes the UL BWPs in the time duration between the timing at which the DCI is received (detected) and the timing at which HARQ-ACK feedback is transmitted, the UE may not perform HARQ-ACK feedback transmission.

More specifically, the UE does not perform HARQ-ACK feedback transmission only when the UE changes UL BWPs in a PCell (primary cell) or a cell transmitting a PUCCH in a time duration between a timing at which DCI scheduling a PDSCH is received (detected) and a timing at which HARQ-ACK feedback is transmitted. On the other hand, the UE can transmit HARQ-ACK feedback when a UL BWP corresponding to PUCCH transmission is not changed even if UL BWPs of an SCell change in a time duration between a timing at which DCI scheduling a PDSCH (DCI that schedules a PDSCH) is received (detected) and a timing at which HARQ-ACK feedback corresponding thereto is transmitted in the SCell.

Figure 19:
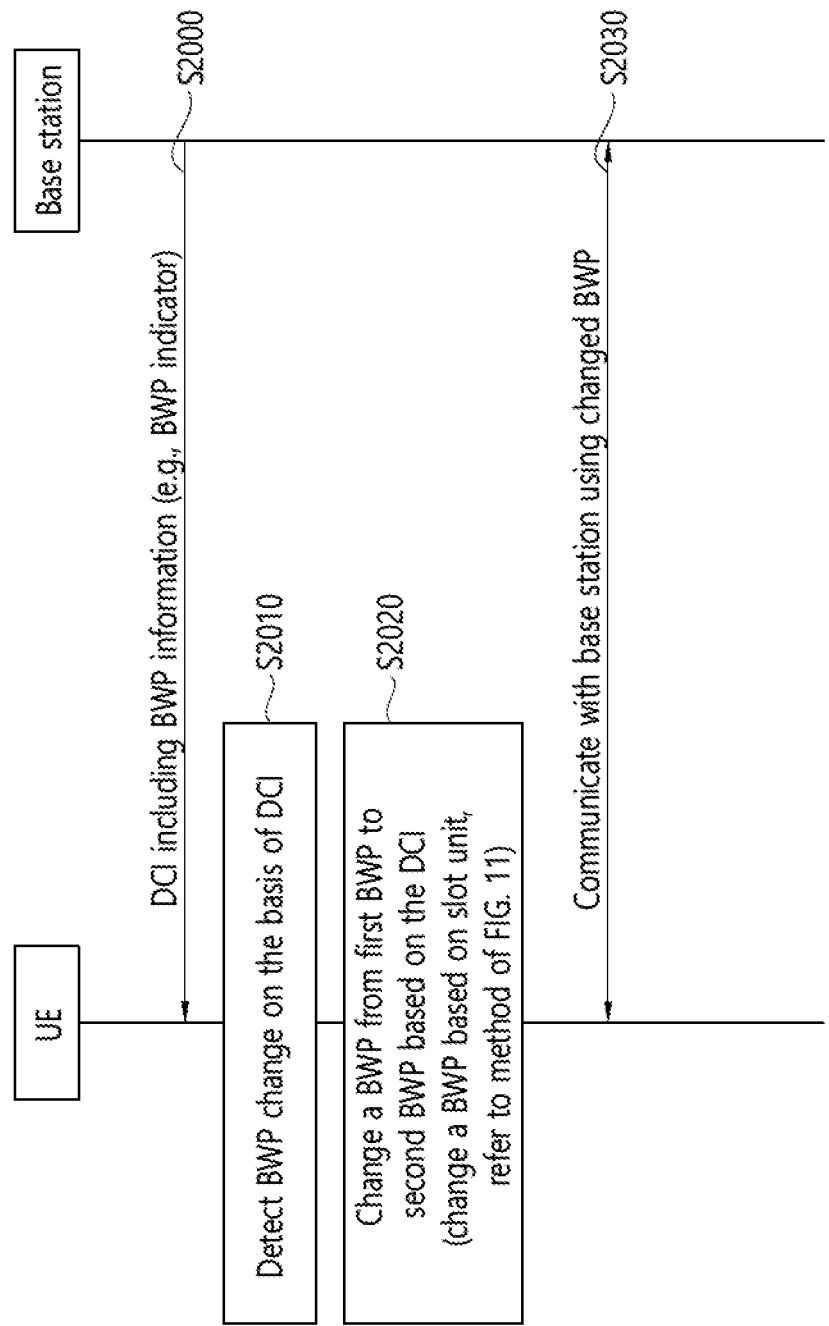
FIG. 19 illustrates a method for operating a base station and a UE during dynamic BWP switching.

FIG. 19 illustrates a method for operating a base station and a UE during dynamic BWP switching.

Referring to FIG. 19, the UE receives DCI including BWP information (e.g., a BWP indicator) (S2000). The DCI may be DCI format 0_1 or DCI format 1_1, for example and may be received through a PDCCH.

The UE can detect BWP change on the basis of the DCI (S2010). That is, the UE detects DCI indicating (signaling) BWP change. For example, the UE can ascertain BWP change on the basis of the BWP indicator included in the DCI. For example, the BWP indicator can signal BWP change by indicating a BWP other than the current active BWP.

The UE change BWPs from a first BWP to a second BWP on the basis of the DCI (S2020). Here, a timing at which the second BWP is applied becomes a problem. This has been described in detail. That is, the UE may not receive/transmit a signal (signal reception/transmission may not be required) in a time duration 121 from a specific symbol (e.g., third symbol) of a slot in which the PDCCH has been received to the start of a slot indicated by a slot offset value of the time domain resource allocation field included in the DCI. That is, the UE can ascertain that the second BWP is applied from the start of a slot in which a PDSCH scheduled by the DCI is received.

The above-described methods can be performed by at least one of the devices of FIGS. 14 to 17.

What is claimed is:

1. A method for changing a bandwidth part (BWP) in a wireless communication system, the method performed by a user equipment (UE) and comprising:
    detecting, in a first time resource, downlink control information (DCI) informing a BWP change; and
    performing the BWP change from a first BWP to a second BWP based on the DCI,
    wherein the DCI is used for scheduling a physical uplink shared channel (PUSCH) and informs a second time resource for transmitting the PUSCH by the UE,
    wherein the second BWP is applied from a beginning of a slot scheduled by the DCI,
    wherein the UE does not transmit uplink information during a time duration between the first time resource of detecting the DCI and the second time resource informed by the DCI,
    wherein based on that a timer for performing the BWP change to a default BWP expires within the time duration, the UE delays the BWP change to the default BWP, which is triggered by the timer, during the time duration, and
    wherein the UE does not transmit or receive a signal until the slot scheduled by the DCI starts.

2. The method of claim 1, wherein the DCI informs downlink BWP change or uplink BWP change.

3. The method of claim 1, wherein a timer value for the timer is maintained during the time duration.

4. The method of claim 1, wherein the first BWP and the second BWP are BWPs related with a same cell.

5. The method of claim 1, wherein the DCI is received through some symbols in a slot including a plurality of symbols in a time domain.

6. A device comprising:
    a transceiver configured to transmit and receive a radio signal; and
    a processor configured to operate in connection with the transceiver, wherein the processor is further configured to:
detect, in a first time resource, downlink control information (DCI) informing to perform a bandwidth part (BWP) change, and
perform the BWP change from a first BWP to a second BWP based on the DCI,
wherein the DCI is used for scheduling physical uplink shared channel (PUSCH) and informs a second time resource for transmitting the PUSCH by the device,
wherein the second BWP is applied from a beginning of a slot scheduled by the DCI,
wherein the device does not transmit uplink information during a time duration between the first time resource of detecting the DCI and the second time resource informed by the DCI,
wherein based on that a timer for performing the BWP change to a default BWP expires within the time duration, the device delays the BWP change to the default BWP, which is triggered by the timer, during the time duration, and
wherein the device does not transmit or receive a signal until the slot scheduled by the DCI starts.

7. The device of claim 6, wherein the DCI informs downlink BWP change or uplink BWP change.

8. The device of claim 6, wherein a timer value for the timer is maintained during the time duration.

9. The device of claim 6, wherein the first BWP and the second BWP are BWPs related with a same cell.

* * * * *